(12) United States Patent
Pmsvvsv et al.

(10) Patent No.: US 11,258,294 B2
(45) Date of Patent: Feb. 22, 2022

(54) MICROGRID WITH POWER EQUALIZER BUS AND METHOD OF OPERATING SAME

(71) Applicant: BLOOM ENERGY CORPORATION, San Jose, CA (US)

(72) Inventors: Prasad Pmsvvsv, Sunnyvale, CA (US); Ranganathan Gurunathan, Bangalore (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/098,797

(22) Filed: Nov. 16, 2020

(65) Prior Publication Data

US 2021/0152016 A1    May 20, 2021

Related U.S. Application Data

(60) Provisional application No. 62/937,338, filed on Nov. 19, 2019.

(51) Int. Cl.
    *H02J 9/06*        (2006.01)
    *H02M 3/04*       (2006.01)

(52) U.S. Cl.
    CPC ............ *H02J 9/061* (2013.01); *H02M 3/04* (2013.01)

(58) Field of Classification Search
    CPC ............ H02J 9/06; H02J 9/061; H02M 3/04
    See application file for complete search history.

(56) References Cited

U.S. PATENT DOCUMENTS

| 4,186,437 A | * | 1/1980 | Cuk | H02M 3/005 363/16 |
| 7,713,649 B2 | | 5/2010 | Hickey et al. | |

(Continued)

FOREIGN PATENT DOCUMENTS

| EP | 2793345 B1 | 11/2016 |
| KR | 10-0497834 B1 | 6/2005 |

OTHER PUBLICATIONS

International Search Report and Written Opinion of the International Searching Authority for International Patent Application No. PCT/US2019/048767, dated Dec. 12, 2019, 15 pages.

(Continued)

*Primary Examiner* — Adam D Houston
(74) *Attorney, Agent, or Firm* — The Marbury Law Group PLLC

(57) ABSTRACT

Various embodiments include methods and systems for implementing managing a microgrid system. The system may include a plurality of power module clusters, a plurality of uninterruptable power modules, a plurality of bidirectional direct current (DC)/DC converters, and a DC power bus. Each one of the power module clusters of the plurality of power module clusters may be electrically connected in parallel to an uninterruptable power module of the plurality of uninterruptable power modules and a first end of a bidirectional DC/DC converter of the plurality bidirectional DC/DC converters, and a second end of each one of the bidirectional DC/DC converters of the plurality of bidirectional DC/DC converters may be electrically connected to the DC power bus. In some embodiments, the plurality of bidirectional DC/DC converters may be electrically connected to in parallel by the DC power bus or in series via a DC power bus ring.

20 Claims, 8 Drawing Sheets

(56) References Cited

U.S. PATENT DOCUMENTS

| | | |
|---|---|---|
| 8,970,176 B2 | 3/2015 | Ballantine et al. |
| 9,106,098 B2 * | 8/2015 | Srinivasan ................ H02J 3/32 |
| 9,214,812 B2 | 12/2015 | Ballantine et al. |
| 9,362,815 B2 | 6/2016 | Gurunathan et al. |
| 9,461,320 B2 | 10/2016 | Ballantine et al. |
| 9,634,512 B1 * | 4/2017 | Kim ........................ H02J 7/00 |
| 9,639,130 B2 | 5/2017 | Gurunathan et al. |
| 9,698,598 B2 | 7/2017 | Ballantine et al. |
| 9,762,071 B2 * | 9/2017 | Mulawski ............ H02J 7/0022 |
| 9,972,852 B2 | 5/2018 | Ballantine et al. |
| 9,979,228 B2 * | 5/2018 | Nishigai ................ H02J 9/061 |
| 9,997,955 B1 * | 6/2018 | Ross ........................ H02J 1/001 |
| 10,003,215 B2 * | 6/2018 | Paatero .................. H02J 9/061 |
| 10,164,464 B1 * | 12/2018 | Ross ........................ G06F 1/30 |
| 10,250,057 B2 * | 4/2019 | Zhao ........................ H02J 7/02 |
| 10,367,215 B2 | 7/2019 | Pmsvvsv et al. |
| 10,389,156 B2 * | 8/2019 | Berkowitz .............. H02J 7/007 |
| 10,424,976 B2 * | 9/2019 | Verghese ................ B60L 53/60 |
| 10,479,222 B2 * | 11/2019 | Gou ........................ B60L 53/12 |
| 10,574,084 B2 * | 2/2020 | Ghosh ............... H02M 3/33523 |
| 10,601,226 B2 | 3/2020 | Gurunathan et al. |
| 10,666,154 B2 * | 5/2020 | Yao .................. H02M 3/33584 |
| 10,756,546 B2 | 8/2020 | Pmsvvsv et al. |
| 10,916,940 B2 * | 2/2021 | Donahue ................ B60L 53/53 |
| 10,960,770 B2 * | 3/2021 | Ichikawa ............... B60L 53/126 |
| 11,034,252 B2 * | 6/2021 | Barnes .................... B60L 53/60 |
| 11,128,147 B2 * | 9/2021 | Ballantine ............... H02J 3/387 |
| 2006/0194082 A1 | 8/2006 | Tucker et al. |
| 2006/0204827 A1 | 9/2006 | Hickey et al. |
| 2008/0265684 A1 * | 10/2008 | Farkas .................... H02J 50/70 307/104 |
| 2009/0325056 A1 * | 12/2009 | Greening ............ H01M 10/482 429/121 |
| 2012/0098336 A1 | 4/2012 | Gurunathan et al. |
| 2012/0112547 A1 * | 5/2012 | Ghosh ...................... H02J 9/062 307/66 |
| 2012/0146587 A1 | 6/2012 | Srinivasan et al. |
| 2012/0267952 A1 | 10/2012 | Ballantine et al. |
| 2012/0326504 A1 | 12/2012 | Ballantine et al. |
| 2012/0326668 A1 | 12/2012 | Ballantine et al. |
| 2013/0183599 A1 | 7/2013 | Otsuka et al. |
| 2013/0253716 A1 | 9/2013 | Gross et al. |
| 2013/0320910 A1 | 12/2013 | Reiser |
| 2014/0009003 A1 | 1/2014 | Ballantine et al. |
| 2014/0058577 A1 * | 2/2014 | Erhart ...................... G05F 1/66 700/297 |
| 2015/0228990 A1 | 8/2015 | Ballantine et al. |
| 2015/0288220 A1 | 10/2015 | Gurunathan et al. |
| 2017/0005480 A1 | 1/2017 | Ballantine et al. |
| 2017/0077535 A1 | 3/2017 | Sudhan S. et al. |
| 2017/0338502 A1 | 11/2017 | Pmsvvsv et al. |
| 2018/0302079 A1 * | 10/2018 | Ewanchuk ........... H03K 17/122 |
| 2019/0052094 A1 | 2/2019 | Pmsvvsv et al. |
| 2019/0204391 A1 | 7/2019 | Cottuli |
| 2019/0312432 A1 | 10/2019 | Gurunathan et al. |
| 2019/0312441 A1 | 10/2019 | Ballantine et al. |
| 2020/0076200 A1 * | 3/2020 | Ballantine ........... H02J 13/0001 |
| 2020/0266658 A1 | 8/2020 | Cottuli et al. |
| 2021/0152016 A1 * | 5/2021 | Pmsvvsv ................ H02J 1/102 |

OTHER PUBLICATIONS

U.S. Appl. No. 15/455,307, filed Mar. 10, 2017, Bloom Energy.

\* cited by examiner

MICROGRID WITH POWER EQUALIZER BUS AND METHOD OF OPERATING SAME

FIELD

The present invention is generally directed to power generation systems and, in particular, to a fuel cell system that efficiently manages fuel cell power output to address degradation of fuel cell system power supply.

BACKGROUND

Electrochemical devices, such as fuel cells, can convert energy stored in fuels to electrical energy with high efficiencies. In a fuel cell system, such as a solid oxide fuel cell (SOFC) system, an oxidizing flow is passed through the cathode side of the fuel cell while a fuel inlet flow is passed through the anode side of the fuel cell. The oxidizing flow is typically air, while the fuel flow can be a hydrocarbon fuel, such as methane, natural gas, pentane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

SOFC systems may be used to power many different loads under many different arrangements. The variety of potential applications creates a need for a SOFC system and control method that can be readily adapted for use with different kinds of loads under different use arrangements.

SUMMARY

Various embodiments may include apparatuses and methods for managing fuel cell microgrid system. In some embodiments, a microgrid system may include a plurality of power module clusters, a plurality of uninterruptable power modules, a plurality of bidirectional direct current (DC)/DC converters, and a DC power bus. In some embodiments, each one of the power module clusters of the plurality of power module clusters may be electrically connected in parallel to an uninterruptable power module of the plurality of uninterruptable power modules and a first end of a bidirectional DC/DC converter of the plurality bidirectional DC/DC converters, and a second end of each one of the bidirectional DC/DC converters of the plurality of bidirectional DC/DC converters may be electrically connected in parallel to the DC power bus.

In some embodiments, a microgrid system may include a plurality of power module clusters, a plurality of uninterruptable power modules, a plurality of bidirectional DC/DC converters, and a plurality of DC power busses. In some embodiments, each one of the power module clusters of the plurality of power module clusters may be electrically connected in parallel to an uninterruptable power module of the plurality of uninterruptable power modules and a first end of a bidirectional DC/DC converter of the plurality bidirectional DC/DC converters, and each one of the bidirectional DC/DC converters of the plurality of bidirectional DC/DC converters may be electrically connected at the first end to a DC power bus of the plurality of DC power busses and at a second end to another DC power bus of the plurality of DC power busses.

In some embodiments, a method of managing a microgrid system may include providing electrical power to a DC power bus by a plurality of bidirectional DC/DC converters, in which each bidirectional DC/DC converter of the plurality of bidirectional DC/DC converters may be electrically connected to at least one power module cluster of a plurality of power module clusters, and in which each bidirectional DC/DC converter may be configured to provide the electrical power from the at least one power module cluster; and drawing electrical power from the DC power bus by a first bidirectional DC/DC converter.

DETAILED DESCRIPTION

Figure 1:
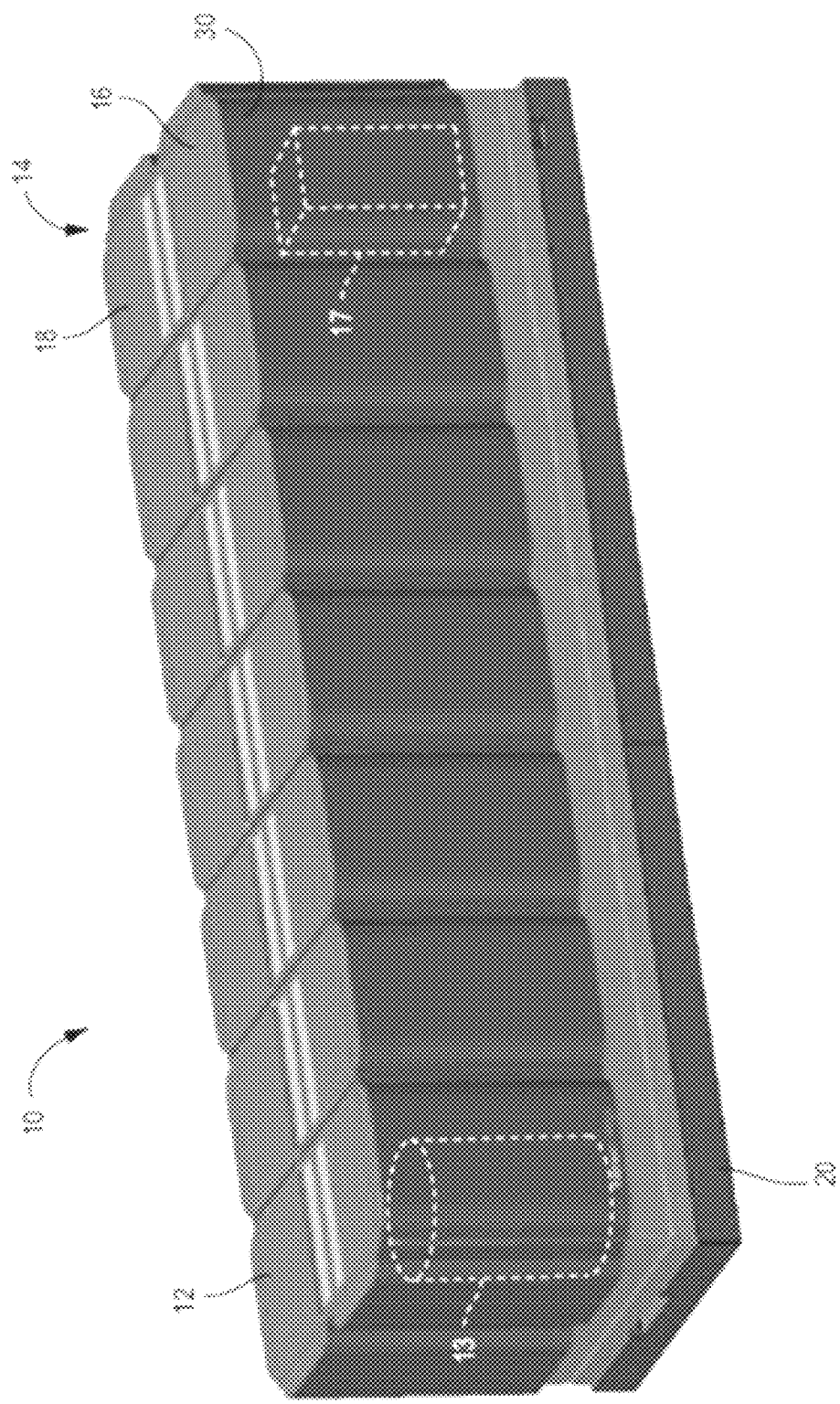
FIG. 1 is a perspective view of a fuel cell system according to various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include electrical circuits, electrical components, and methods for managing a fuel cell microgrid system to address degradation of fuel cell microgrid system power supply. In some embodiments, the fuel cell microgrid system may be configured to electrically connect a power module cluster paired with an uninterruptable power module to other uninterruptable power modules in parallel via a DC power bus (e.g., DC power equalizer bus). In some embodiments, the fuel cell microgrid system may be configured to electrically connect a power module cluster paired with an uninterruptable power module to other uninterruptable power modules in parallel via DC power busses in a ring configuration. In some embodiments, the fuel cell microgrid system may be configured to automatically transfer electrical power to an uninterruptable power module paired with a degraded power module cluster. In some embodiments, the fuel cell microgrid system may be configured to respond to a manual instruction to transfer electrical power to an uninterruptable power module paired with a degraded power module cluster. The terms "electrical power" and "power" are used herein to refer to any of electrical current or voltage.

In a fuel cell microgrid system, uninterruptable power modules containing a direct current (DC)/alternating current (AC) inverter may be configured for use in a master-slave electrical inverter architecture with DC electrical power sources. Each uninterruptable power module may be associated with a DC electrical power source. In such a master-slave architecture, each uninterruptable power module may be forced to draw an equal amount of electrical power from the uninterruptable power module's associated DC electrical power source. As such, an available AC output of the combined uninterruptable power modules may be an electrical power output of the DC electrical power sources multiplied by the number of uninterruptable power modules. To accommodate the electrical power draw by each uninterruptable power module to maintain a rated AC electrical power output of the fuel cell microgrid system, each DC electrical power source may need to be configured to maintain a minimum electrical power output at all times. The master-slave architecture causes unnecessary redundancies in each DC electrical power source to account for degradation of and/or failures in the DC electrical power source, which increases the cost of construction and implementation of fuel cell microgrid systems.

Previous solutions to this problem have included providing DC/DC converters that are each electrically connected in series between an associated DC electrical power source and an uninterruptable power module. However, such electrical circuit configurations have practical drawbacks. For example, a cost of designing DC/DC converters for the same electrical power rating as the DC electrical power sources; an electrical power efficiency loss by necessarily processing the electrical power through all the DC/DC converters; a DC/DC converter being a single point of failure that can affect the reliability of the fuel cell microgrid system; an increased physical footprint of the fuel cell microgrid system because of the size of the components needed to accommodate DC/DC converters for the same electrical power rating as the DC electrical power sources; and a limited DC bus size based on a size of a DC switchboard configured to support the DC/DC converters.

A fuel cell microgrid system of some embodiments of the invention may be designed to alleviate the foregoing drawbacks. In some embodiments, the fuel cell microgrid system may include multiple bidirectional DC/DC converters, and each bidirectional DC/DC converter may be electrically connected in parallel with an associated uninterruptable power module and a DC electrical power source. In some embodiments, each of the bidirectional DC/DC converters may be electrically connected in parallel with the remaining bidirectional DC/DC converters by a DC power bus. In some embodiments, each bidirectional DC/DC converter may be electrically connected in parallel with any number and combination of associated uninterruptable power modules and DC electrical power sources. In some embodiments, each of the bidirectional DC/DC converters may be electrically connected in series in a ring, with each bidirectional DC/DC converter electrically connected to a next bidirectional DC/DC converter by a DC power bus, and with a last bidirectional DC/DC converter electrically connected to a first bidirectional DC/DC converter. The bidirectional DC/DC converters may be configured to shift electrical power output of a DC electrical power source from an uninterruptable power module to another uninterruptable power module. The bidirectional DC/DC converters may be configured to shift the electrical power output to compensate for reduced electrical power output from a DC electrical power source associated with the other uninterruptable power module.

The bidirectional DC/DC converters may be designed for an electrical power rating based on an amount of electrical power output of a DC electrical power source that is intended to be transferable from an uninterruptable power module to another uninterruptable power module. The electrical power rating of the bidirectional DC/DC converters may be less than the electrical power rating of the DC electrical power sources. The electrical power rating of the DC power bus may configured to accommodate an electrical power capacity of the electrical power rating of the bidirectional DC/DC converters multiplied by a fraction of the number of DC electrical power sources. The electrical power rating of the DC power bus may be less than needed to accommodate DC/DC converters for the same electrical power rating as the DC electrical power sources. As such, the bidirectional DC/DC converters and components needed to accommodate DC/DC converters may be sized accordingly for their electrical power ratings. A minimum of two, but less than all of the bidirectional DC/DC converters in a fuel cell microgrid system may be used to shift the electrical power output of a DC electrical power source. The electrical power efficiency loss may be proportional to the number of bidirectional DC/DC converters used to shift the electrical power output of a DC electrical power source. Further, different combinations of bidirectional DC/DC converters may be used to shift the electrical power output of a DC electrical power source making failure of any one of the bidirectional DC/DC converters manageable by using another bidirectional DC/DC converter.

FIG. 1 illustrates an example of one DC electrical power source, which comprises modular fuel cell system that is more fully described in U.S. Pat. No. 8,440,362, incorporated herein by reference for descriptions of the modular fuel cell system. The modular system may contain modules and components described above as well as in U.S. Pat. No. 9,190,693, which is incorporated herein by reference for descriptions of the modular fuel cell system. The modular design of the fuel cell system enclosure 10 provides flexible system installation and operation.

The modular fuel cell system enclosure 10 includes a plurality of power module housings 12 (containing a fuel cell power module components), one or more fuel input (i.e., fuel processing) module housings 16, and one or more power conditioning (i.e., electrical output) module housings 18. For example, the system enclosure may include any desired number of modules, such as 2-30 power modules, for example 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in an example embodiment in FIG. 1, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may include more than one row of modules 12. For example, as noted above, the system may include two rows of power modules stacked back to back.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door 30 to module 14 may be on the side rather than on the front of the cabinet.

Figure 2:
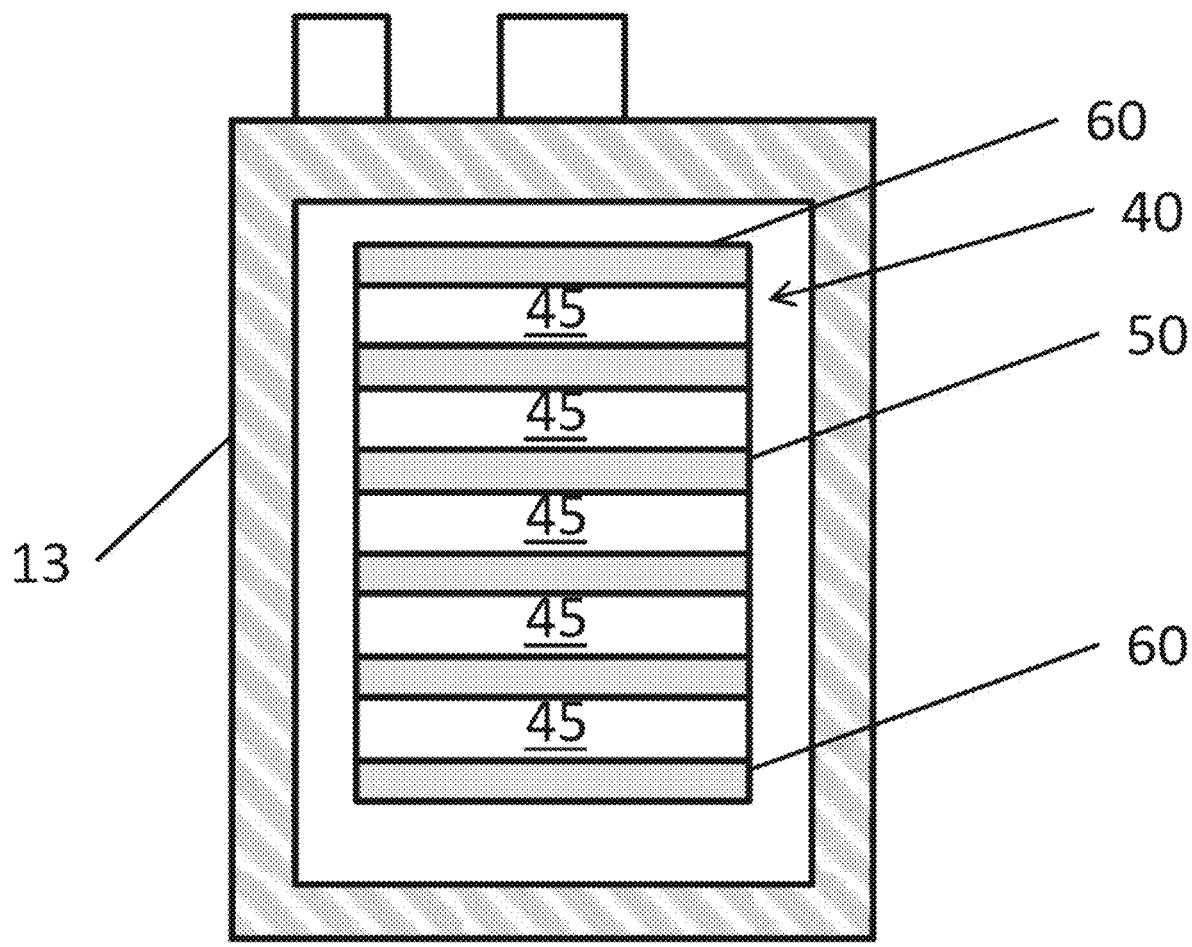
FIG. 2 is a schematic side cross-sectional view of a hot box according to various embodiments.

FIG. 2 illustrates a plan view of a fuel cell system hotbox 13 including a fuel cell stack or column 40. The hotbox 13 is shown to include the fuel cell stack or column 40. However, the hotbox 13 may include two or more of the stacks or columns 40. The stack or column 40 may include the electrically connected fuel cells 45 stacked on one another, with the interconnects 50 disposed between the fuel cells 45. The first and last fuel cells 45 in the stack or column are disposed between a respective end plate 60 and interconnect 50. The end plates 60 are electrically connected to electrical outputs of the fuel cell stack or column 40. The hotbox 13 may include other components, such as fuel conduits, air conduits, seals, electrical contacts, etc, and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni-SSZ or a nickel-samaria doped ceria (SDC) cermet, and a cathode electrode, such as lanthanum strontium manganite (LSM)). The interconnects 50 and/or end plates 60 may comprise any suitable gas impermeable and electrically conductive material, such as a chromium-iron alloy, such as an alloy containing 4 to 6 wt % iron and balance chromium. The interconnects 50 electrically connect adjacent fuel cells 45 and provide channels for fuel and air to reach the fuel cells 45.

Fuel cell systems, such as modular fuel cell system enclosure 10, may include and/or be augmented by various pieces of support equipment. Support equipment may include various auxiliary equipment and systems to support the operation of the fuel cell system. Support equipment may vary based on constraints and/or features at a site where the fuel cell system is installed. As non limiting examples, support equipment may include, fuel support equipment, air support equipment, and/or ventilation support equipment. One type of fuel support equipment may include equipment configured to control supply and/or exhaust fuel pressure in the fuel cell system, such as a fuel blower or pump to supply fuel to, recycle fuel/exhaust in, and/or exhaust fuel from the fuel cell system. Another type of fuel support equipment may be configured to process fuel for the fuel cell system, such as a fuel pre-heater, exhaust scrubber, etc. Other types of fuel support equipment may also be used. One type of air support equipment may be air supply equipment configured to provide air into the fuel cell system and/or exhaust air from the fuel cell system, such as blowers or fans to provide air to and/or exhaust air from a fuel cell cathode, an anode tail gas oxidizer (ATO), an air heat exchanger, a CPOx reactor, etc. Other types of air support equipment may also be used. One type of ventilation support equipment may include equipment configured to ventilate from and/or circulate air in portions of housings external of the hot box (e.g., portions within modular fuel cell system enclosure 10 but external of the hot box 13 itself), such as a ventilation fan to blow air from within the enclosure 10 out of the enclosure 10 to maintain an acceptable enclosure 10 pressure. Other types of ventilation support equipment may also be used. Support equipment, especially support equipment including electric motors may require Alternating Current (AC) power, for example one, two, or three phase AC power, for operation.

In some embodiments, described further herein with reference to FIGS. 3-8, when any DC power bus is in need of power, that particular DC bus voltage will start to decay. When the DC bus voltage reaches a certain predetermined voltage level, a bidirectional DC/DC converter may detect the voltage level and try to provide DC power to the DC power bus until the DC bus voltage becomes a normal value. When there is too much power for the DC power bus, the bidirectional DC/DC converter may reduce power to the DC power bus in order to reduce DC bus voltage. An equilibrium may be maintained when the bidirectional DC/DC converter supplies a specific amount of power to maintain DC bus voltage within designated limits.

Figure 3:
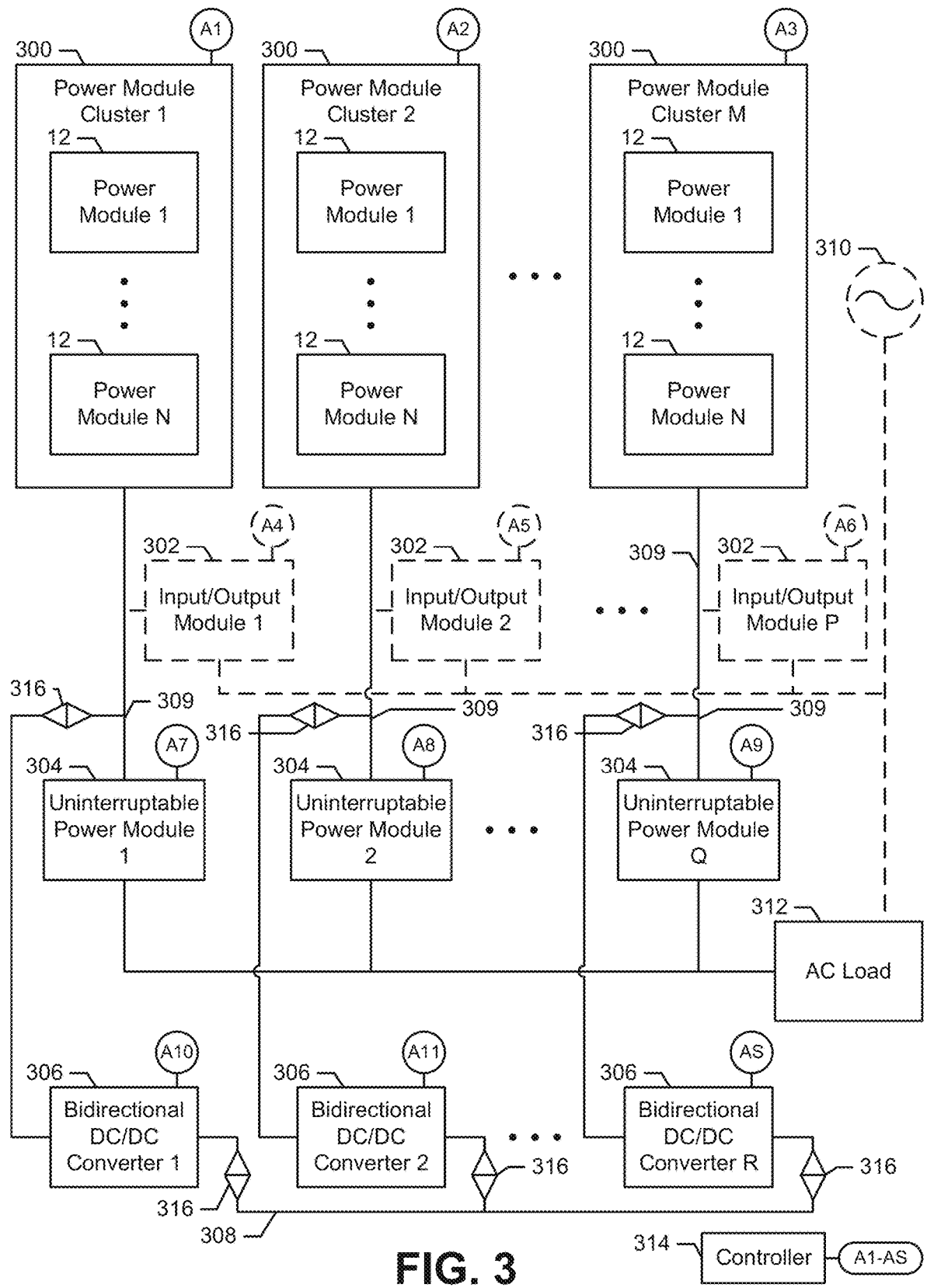
FIG. 3 is a block diagram of a fuel cell microgrid system according to some embodiments.
Figure 4:
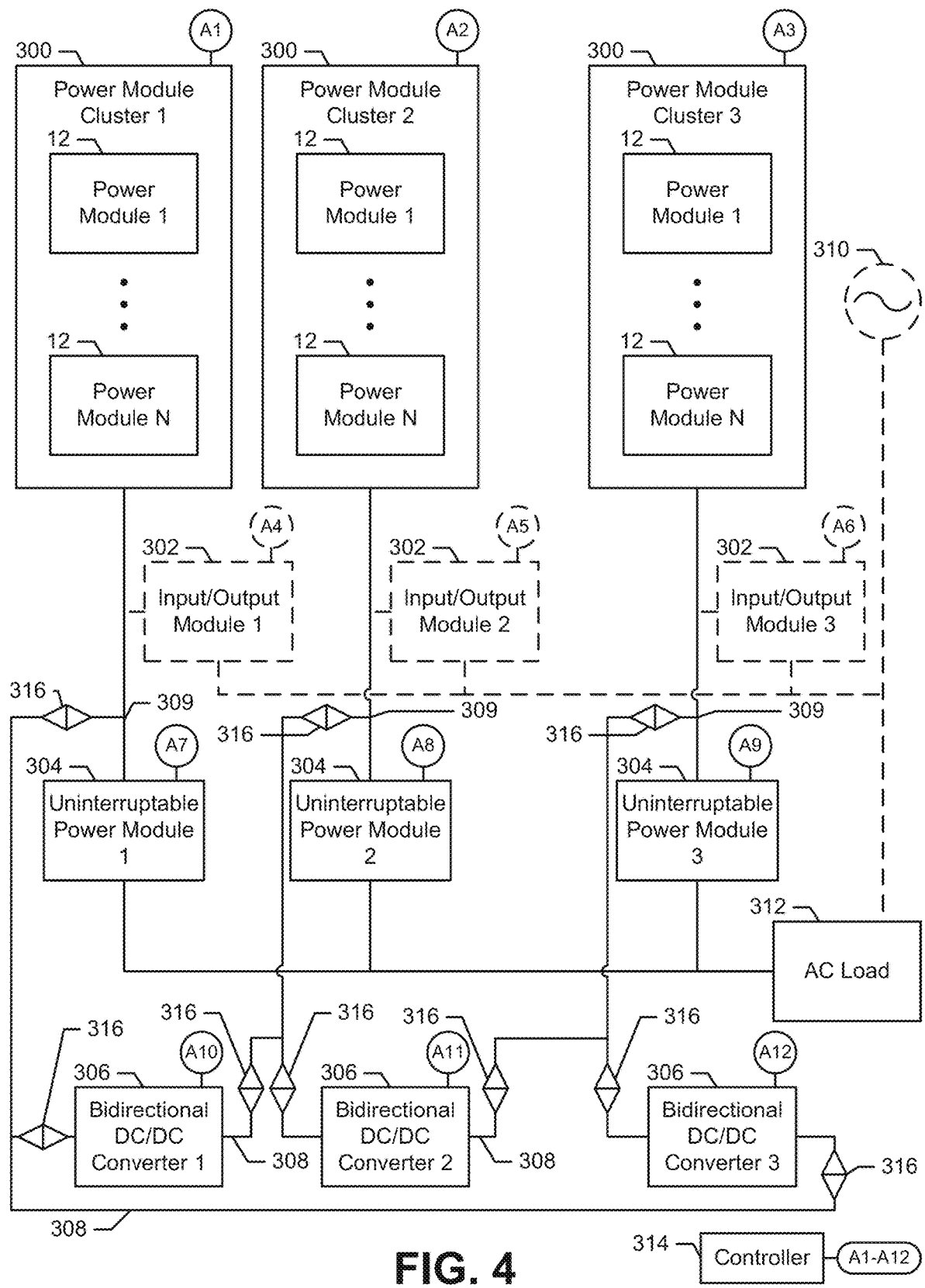
FIG. 4 is a block diagram of a fuel cell microgrid system according to some embodiments.

FIGS. 3 and 4 illustrate respective first and second embodiments of a fuel cell microgrid system. A fuel cell microgrid system may include a variety of components, including any number and combination of power modules 12, power module clusters 300, uninterruptable power modules 304, bidirectional DC/DC converters 306, DC power busses 308, 309, and over current protectors 316. In some embodiments, the fuel cell microgrid system may also include any number of optional input/output modules 302, each of which may include a DC/AC inverter. The fuel cell microgrid system may include any number of control devices (herein also referred to as controllers) 314 configured to receive data signals from and send control signals to any number and combination of the components of the fuel cell microgrid system via any number "S" of wired and/or wireless connections A1-AS. The control device(s) 314 may be any form of programmable computing device or system, such as a server or system control device, which may be configured to perform operations of various embodiments, including operations of the methods 600, 700, 800 described herein with reference to FIGS. 6-8. The fuel cell microgrid system may be electrically connected to an AC load 312 configured to operate using AC electrical power. Preferably, each uninterruptable power module 304 is configured to provide the same amount of power to the AC load 312. In some embodiments, the fuel cell microgrid system may be electrically connected to an AC electrical power source, such as an electrical power utility grid 310. FIGS. 3 and 4 illustrate various embodiments that are meant to be illustrative examples and not limiting of the scope of the claims.

A fuel cell microgrid system may include any number "M" of power module clusters 300, such as 2 to 20, e.g., 3 to 6. Each power module cluster 300 may include any number of fuel cell power modules 12 that may be configured as described herein with reference to FIG. 1. In some embodiments, the number of power modules 12 included in a power module cluster 300 may vary between the various power module clusters 300. In some embodiments, each power module cluster 300 may include any number "N" of power modules 12, such as 1 to 12, e.g., 6 to 8. The power modules 12 of single power module cluster 300 may be insufficient to generate electrical power to satisfy at least normal electrical power demands of an AC load 312. The number of power modules 12 divided among multiple power module clusters 300 in a fuel cell microgrid system may be at least as many power modules 12 necessary to generate sufficient electrical power to satisfy at least normal electrical power demands of an AC load 312. In various embodiments, the number of power modules 12 may include any number of redundant power modules 12 so that in case of reduced or no electrical output from at least one power module 12, a redundant power module 12 may be used to continue supply of the electrical power demand of an AC load 312.

A power module cluster 300 may be configured in a manner in which the power module cluster 300 has a power module cluster output threshold (such as a power module cluster output set point) that may represent a minimum value of electrical power output from the power module cluster 300 to provide a portion of the electrical power required to satisfy the electrical power demand of an AC load 312. Preferably, the power module cluster output threshold may be configured for the power module cluster 300 to provide sufficient power for a respective uninterruptable power module 304, electrically connected to the power module cluster 300 via a DC power bus 309, to provide a same amount power to an AC load 312 as the other power modules 304 of the fuel cell microgrid system. The power module cluster output threshold for the power module cluster 300 may be determined and/or set by the controller 314. In some embodiments, the power module cluster output threshold may be dependent on the electrical power output by other power module clusters of a fuel cell microgrid system. In some embodiments, the power module cluster output threshold may be the same for any number of the power module clusters 300 of a fuel cell microgrid system. In some embodiments, the power module cluster output threshold may vary for any number of the power module clusters 300 of a fuel cell microgrid system, including a minimum value of no electrical power. In some embodiments, the power module cluster output threshold may be configured as a value representative of electrical voltage or electrical current and voltage.

The power module cluster 300 may be configured to generate and output an electrical power that achieves, such as by meeting and/or exceeding, the power module cluster output threshold. The power module cluster 300 may generate the electrical power via any number and combination of the power module cluster's power modules 12. A set point for electrical power generation and output for each power module 12 may be determined and/or set by the controller 314. In some embodiments, the electrical power generated by the power modules 12 of the power module cluster 300 may be the same for any number of the power modules 12. In some embodiments, the electrical power generated by the power modules 12 of the power module cluster 300 may vary for any number of the power modules 12, including no electrical power.

An uninterruptable power module 304 may be electrically connected to a respective power module cluster 300 and to a respective bidirectional DC/DC converter 306 in parallel via a DC power bus 309, and to an AC load 312. The uninterruptable power module 304 may be configured as or to include a DC/AC inverter. The uninterruptable power module 304 may be configured to invert a DC electrical current received from an electrical power source to an AC electrical current. The uninterruptable power module 304 may be unidirectional, configured to receive electrical power at an input end and to supply electrical power at an output end. In some embodiments, the electrical power source may include any number and combination of a power module cluster 300 and/or a power module 12 electrically connected via a DC power bus 309, and/or an electrical power utility grid 310 electrically connected via an input/output module 302. The uninterruptable power module 304 may be electrically connected at an input end to any number and combination of electrical power sources and electrically connected to an AC load 312 at an output end. The uninterruptable power module 304 may be electrically connected to one or more additional electrical power sources, such as other power module clusters 300, via other components of a fuel cell microgrid system, such as a DC power bus 308 and a bidirectional DC/DC converter 306. A DC electrical current received by the uninterruptable power module 304 from one or more electrical power sources may be inverted by the uninterruptable power module 304 and supplied to an AC load 312 as an AC current. In some embodiments, the uninterruptable power module 304 may be configured to supply a designated amount of electrical power having a given voltage and/or current, for example, based on electrical power configuration of an AC load 312 and/or an electrical power demand of the AC load 312. In some embodiments, each uninterruptable power module 304 of a fuel cell microgrid system may be configured to receive a same amount of input electrical power and output a same amount of output electrical power. The electrical power inversion and output by the uninterruptable power module 304 may be determined and controlled by the controller 314. A fuel cell microgrid system may include any number "Q" of uninterruptable power modules 304, each disposed between an electrical power source and an AC load 312. In some embodiments, a fuel cell microgrid system may include a one-to-one ratio of power module clusters 300 to uninterruptable power modules 304, such that Q=M and each power module cluster 300 is electrically connected to a respective one of an uninterruptable power modules 304 by a respective DC power bus 309.

A bidirectional DC/DC converter 306 may be electrically connected to a power module cluster 300 and an uninterruptable power module 304 in parallel, and to at least one other bidirectional DC/DC converter 306 via the DC power bus 308. The bidirectional DC/DC converter 306 may be configured to convert a DC electrical current received from an electrical power source, such as from a respective power module cluster 300 via a respective DC power bus 309, to a higher or lower voltage. The bidirectional DC/DC converter 306 may be configured to receive electrical power and to supply electrical power at both a first end and a second end. In various embodiments, the electrical power source may include any number and combinations of power module clusters 300 electrically connected via a DC power bus 309, and/or an electrical power utility grid 310 electrically connected via an input/output module 302. The bidirectional DC/DC converter 306 may be electrically connected to one or more additional electrical power sources, such as other power module clusters 300, via other components of a fuel cell microgrid system, such as a DC power bus 308 and a bidirectional DC/DC converter 306.

Each bidirectional DC/DC converter 306 may be electrically connected at a first end to a respective power module cluster 300 and an uninterruptable power module 304 in parallel via a respective DC power bus 309 and electrically connected to a DC power bus 308 at a second end. A DC electrical current received by the bidirectional DC/DC converter 306 from an electrical power source at a first end via a respective DC power bus 309 may be converted by the bidirectional DC/DC converter 306 and supplied to a DC power bus 308. A DC electrical current received by the bidirectional DC/DC converter 306 from an electrical power source at a second end via the DC power bus 308 may be converted by the bidirectional DC/DC converter 306 and supplied to a respective uninterruptable power module 304 via the respective DC power bus 309. In various embodiments, the bidirectional DC/DC converter 306 may be configured to supply a designated amount of electrical power having a given voltage and/or current based on electrical power capacity of a fuel cell microgrid system and/or an electrical power demand of AC loads 312. A designated amount of electrical power supplied by the bidirectional DC/DC converter 306 may be based on voltage and/or amperage electrical power supplied by a power module cluster 300, other bidirectional DC/DC converters 306, and/or on a DC power bus 308. The designated amount of electrical power supplied by the bidirectional DC/DC converter 306 may be determined and/or set by the controller 314. A fuel cell microgrid system may include any number "R" of bidirectional DC/DC converters 306 disposed between a power module cluster 300 and an uninterruptable power module 304 connected in parallel, and a DC power bus 308. In various embodiments, a fuel cell microgrid system may include a one-to-one ratio of power module clusters 300 to bidirectional DC/DC converters 306, such that R=M and each power module cluster 300 is electrically connected to a respective one of a bidirectional DC/DC converter 306 by a respective DC power bus 309.

In some embodiments, the bidirectional DC/DC converter 306 may be a non-isolated bidirectional DC/DC converter 306. In some embodiments, the bidirectional DC/DC converters 306 may be multiple unidirectional DC/DC converters as described further herein with reference to FIG. 5.

The DC power bus 308 (e.g., DC power equalizer bus) may be configured as a common electrical conduit for at least two bidirectional DC/DC converters 306. The DC power bus 308 may be configured to transmit electrical power between the at least two bidirectional DC/DC converters 306. In some embodiments, the DC power bus 308 may electrically connect a second end of each of the at least two bidirectional DC/DC converters 306, as in the example illustrated in FIG. 3. In some embodiments, the DC power bus 308 may electrically connect a first end of one of the at least two bidirectional DC/DC converters 306 and a second end of one other of the at least two bidirectional DC/DC converters 306, as in the example illustrated in FIG. 4.

An optional input/output module 302 may be electrically connected to a power module cluster 300, an uninterruptable power module 304, and a bidirectional DC/DC converter 306 in parallel via a respective DC power bus 309, and to an AC load 312 and/or an electrical power utility grid 310. The input/output module 302 may be configured as or to include a DC/AC inverter. The input/output module 302 may be configured to invert a DC electrical current received from a DC electrical power source, via a respective DC power bus 309, to an AC electrical current and/or AC electrical current received from an AC electrical power source to a DC electrical current. The input/output module 302 may be configured to receive electrical power as a DC current at a first end from a DC electrical power source, via a respective DC power bus 309, and to supply electrical power as an AC electrical current at a second end. In various embodiments, the DC electrical power source may include any number and combinations of power module clusters 300 electrically connected via a DC power bus 309. The input/output module 302 may be electrically connected to one or more additional DC electrical power sources, such as other power module clusters 300, via other components of a fuel cell microgrid system, such as a DC power bus 308 and a bidirectional DC/DC converter 306. The AC electrical power source may be an electrical power utility grid 310. In some embodiments, the input/output module 302 may be configured to receive electrical power as an AC current at a second end from the electrical power utility grid 310 and to supply electrical power as a DC electrical current at a first end.

The input/output module 302 may be electrically connected at first end to a DC electrical power source and electrically connected to an AC load 312 and/or an electrical power utility grid 310 at a second end. A DC electrical current received by the input/output module 302 from a DC electrical power source may be inverted by the input/output module 302 and supplied to an AC load 312 and/or an electrical power utility grid 310. In some embodiments, an AC electrical current received by the input/output module 302 from an electrical power utility grid 310 may be inverted by the input/output module 302 and supplied to a power module cluster 300. In various embodiments, the input/output module 302 may be configured to supply a designated amount of electrical power having a given voltage and/or current based on electrical power configuration of an AC load 312 and/or an electrical power demand of the AC load 312, an electrical power utility grid 310, and/or power module cluster 300. The designated amount of electrical power supplied by the input/output module 302 may be determined and/or set by the controller 314. A fuel cell microgrid system may include any number "P" of input/output modules 302, each electrically connected by a respective DC power bus 309 to a power module cluster 300, an uninterruptable power module 304, and a bidirectional DC/DC converter 306 in parallel, and electrically connected to an AC load 312 and/or an electrical power utility grid 310. In some embodiments, a fuel cell microgrid system may include a one-to-one ratio of input/output modules 302 to power module clusters 300, such that P=M and each power module cluster 300 is electrically connected to a respective one of an input/output module 302 by a respective DC power bus 309.

An AC load 312 may be configured to consume electrical power from a fuel cell microgrid system. In various embodiments, electrical power may be provided to a fuel cell microgrid system by any number and combination of a power modules 12 and power module clusters 300. A fuel cell microgrid system may provide electrical power to any number of AC loads 312. A voltage and/or amperage of electrical power required by an AC load 312 may be an electrical power demand of the AC load 312 on a fuel cell microgrid system. In some embodiments, multiple AC loads 312 may require voltage and/or amperage of electrical power to be within specific requirements, and combined these requirements may present an electrical power demand of the AC load 312 on a fuel cell microgrid system.

In some embodiments, the controller 314 may be a central controller 314 configured to communicatively connect to any number and combination of components of a fuel cell microgrid system. In some embodiments, the controller 314 may be multiple dispersed controllers 314 configured to communicatively connect to any number and combination of components of a fuel cell microgrid system. In some embodiments, the controller 314 may be a standalone controller of a fuel cell microgrid system. In some embodiments, the controller 314 may be an integrated controller of any number and combination of components of a fuel cell microgrid system. Any number and combination of the forgoing configurations of the controller 314 may be implemented in a fuel cell microgrid system.

Optional over current protectors 316 (e.g., discharger) maybe located on each DC power bus 308, 309. An over current protector 316 may be a diode, a fuse, a relay, etc.

FIG. 3 illustrates an example of a fuel cell microgrid system in which bidirectional DC/DC converters 306 may be electrically connected in parallel via a DC power bus 308 at a second end of each of the bidirectional DC/DC converters 306. Each of the bidirectional DC/DC converters 306 may be further electrically connected to respective power module clusters 300 and uninterruptable power modules 304 in parallel via a respective DC power bus 309 at a first end of each of the bidirectional DC/DC converters 306.

Each of the power module clusters 300 may be configured to generate and output a designated amount of electrical power having a given voltage and/or current as an electrical power output to achieve a power module cluster output threshold. A power module cluster 300 may be configured to output the electrical power output to a respective DC power bus 309 electrically connecting the power module cluster 300 to a bidirectional DC/DC converter 306 and an uninterruptable power module 304 in parallel. Each bidirectional DC/DC converter 306 may be configured to provide part of the electrical power output as a designated amount of electrical power having a given voltage and/or current to the DC power bus 308, which may combine as a designated DC bus electrical power and be represented as a DC bus threshold for indicating that all power module clusters 300 output a same amount of electrical power. In some embodiments, the DC bus threshold may be configured as a value representative of electrical voltage or electrical current and voltage.

A bidirectional DC/DC converter 306 may be configured to sense the electrical power output of the power module cluster 300 on the respective DC power bus 309 electrically connecting the bidirectional DC/DC converter 306 and the power module cluster 300. In some embodiments, the bidirectional DC/DC converter 306 may be configured to sense the electrical power output of the power module cluster 300 on the respective DC power bus 309 as electrical current and/or voltage. The bidirectional DC/DC converter 306 may be configured to compare the electrical power output to the power module cluster output threshold. Failure or degradation of a power module 12 may cause a respective power module cluster 300 to generate less than the designated amount of electrical power. The electrical power output of a power module cluster 300 having a failing or degraded power module 12 may be less than the power module cluster output threshold, and not the same as other power module clusters 300 of the fuel cell microgrid system. In response to determining that the electrical power output does not achieve the power module cluster output threshold, the bidirectional DC/DC converter 306 may increase an electrical power draw on the DC power bus 308. The bidirectional DC/DC converter 306 may increase the electrical power draw on the DC power bus 308 by an amount by which the electrical power output falls short of the power module cluster output threshold. In some embodiments, the bidirectional DC/DC converter 306 may be configured to increase the electrical power draw on the DC power bus 308 as electrical current and/or voltage.

A bidirectional DC/DC converter 306 may be configured to sense a current DC bus electrical power on the DC power bus 308 and determine whether the current DC bus electrical power achieves, such as by meeting and/or exceeding, the DC bus threshold. In some embodiments, the bidirectional DC/DC converter 306 may be configured to sense the current DC bus electrical power on the DC power bus 308 as electrical current and/or voltage. An increased electrical power draw on the DC power bus 308, due to a power module cluster 300 generating an electrical power output less than the power module cluster output threshold, and not the same as other power module clusters 300 of the fuel cell microgrid system, may affect the current DC bus electrical power, such as by lowering the current DC bus electrical power to below the DC bus threshold. In response to determining that the current DC bus electrical power does not achieve the DC bus threshold, the bidirectional DC/DC converter 306 may increase a draw of electrical power on the power module cluster 300 to which the bidirectional DC/DC converter 306 is connected in parallel with the uninterruptable power module 304 by the respective DC power bus 309. In some embodiments, the bidirectional DC/DC converter 306 may increase a draw of electrical power on the power module cluster 300 by an amount by which the current DC bus electrical power falls short of the DC bus threshold. In some embodiments, multiple bidirectional DC/DC converters 306 may increase a draw of electrical power on multiple power module clusters 300. In some embodiments, the multiple bidirectional DC/DC converters 306 may increase a draw of electrical power on multiple power module clusters 300 by equal amounts. In some embodiments, multiple bidirectional DC/DC converters 306 may increase a draw of electrical power on multiple power module clusters 300 by varying amounts. In some embodiments, any number and combination of bidirectional DC/DC converters 306 may be configured to increase the electrical power draw on any number and combination of power module clusters 300 as electrical current and/or voltage. The power module cluster 300, electrically connected to a bidirectional DC/DC converter 306 that increases a draw of electrical power on the power module cluster 300, may increase electrical power generation and output. In some embodiments the power module cluster 300 may increase electrical power generation and output by an amount of increased draw of electrical power by the electrically connected bidirectional DC/DC converter 306. The bidirectional DC/DC converter 306 may provide additional electrical power to the DC power bus 308 to make up for at least part of the increased electrical power draw on the DC power bus 308.

For example, a first bidirectional DC/DC converter 306 may determine that an electrical power output by a first power module cluster 300 does not achieve the power module cluster output threshold. In response to determining that the electrical power output does not achieve the power module cluster output threshold, the first bidirectional DC/DC converter 306 may increase an electrical power draw on the DC power bus 308. The increased electrical power draw on the DC power bus 308 by the first bidirectional DC/DC converter 306 may affect the current DC bus electrical power. At least a second bidirectional DC/DC converter 306 may determine that the current DC bus electrical power does not achieve the DC bus threshold. In response to determining that the current DC bus electrical power does not achieve the DC bus threshold, at least the second bidirectional DC/DC converter 306 may increase an electrical power draw on at least a second power module cluster 300. At least the second bidirectional DC/DC converter 306 may provide additional electrical power to the DC power bus 308 to make up for at least part of the electrical power draw on the DC power bus 308 by the first bidirectional DC/DC converter 306.

FIG. 4 illustrates an example of a fuel cell microgrid system in which bidirectional DC/DC converters 306 may be electrically connected in series via DC power busses 308, which in combination may form a larger ring DC power bus. Each DC/DC converter 306 may be electrically connected to a DC/DC converter 306 at first end and to a DC/DC converter 306 at a second end. Each of the bidirectional DC/DC converters 306 may be further electrically connected to respective power module clusters 300 and uninterruptable power modules 304 in parallel via a respective DC power bus 309 at a first end of each of the bidirectional DC/DC converters 306.

Each of the power module clusters 300 may be configured to generate and output a designated amount of electrical power having a give voltage and/or current as an electrical power output to achieve a power module cluster output threshold. A power module cluster 300 may be configured to output the electrical power output to a respective DC power bus 309 electrically connecting the power module cluster 300 to a bidirectional DC/DC converter 306 and an uninterruptable power module 304 in parallel. Each bidirectional DC/DC converter 306 may be configured to provide part of the electrical power output as a designated amount of electrical power having a given voltage and/or current to a DC power bus 308. In some embodiments, the designated amount of electrical power to a DC power bus 308 may be a designated DC bus electrical power and may be represented as a DC bus threshold on the DC power bus 308 for indicating that all power module clusters 300 output a same amount of electrical power. In some embodiments, the designated amount of electrical power to each DC power bus 308 may be combined as a designated DC bus electrical power and be represented as a DC bus threshold on the DC power bus ring for indicating that all power module clusters 300 output a same amount of electrical power. In some embodiments, the DC bus threshold may be configured as a value representative of electrical voltage or electrical current and voltage.

A bidirectional DC/DC converter 306 may be configured to sense the electrical power output of the power module cluster 300 on the respective DC power bus 309 electrically connecting the bidirectional DC/DC converter 306 and the power module cluster 300. In some embodiments, the bidirectional DC/DC converter 306 may be configured to sense the electrical power output of the power module cluster 300 on the respective DC power bus 309 as electrical current and/or voltage. The bidirectional DC/DC converter 306 may be configured to compare the electrical power output to the power module cluster output threshold. Failure or degradation of a power module 12 may cause a respective power module cluster 300 to generate less than the designated amount of electrical power. The electrical power output of a power module cluster 300 having a failing or degraded power module 12 may be less than the power module cluster output threshold, and not the same as other power module clusters 300 of the fuel cell microgrid system. In response to determining that the electrical power output does not achieve the power module cluster output threshold, the bidirectional DC/DC converter 306 may increase an electrical power draw on the DC power bus 308. In some embodiments, in response to determining that the electrical power output does not achieve the power module cluster output threshold, the bidirectional DC/DC converter 306 may increase an electrical power draw on the DC power bus ring. The bidirectional DC/DC converter 306 may increase the electrical power draw on the DC power bus 308 by an amount by which the electrical power output falls short of the power module cluster output threshold. In some embodiments, the bidirectional DC/DC converter 306 may increase the electrical power draw on the DC power bus ring by an amount by which the electrical power output falls short of the power module cluster output threshold. In some embodiments, the bidirectional DC/DC converter 306 may be configured to increase the electrical power draw on the DC power bus 308 as electrical current and/or voltage. In some embodiments, the bidirectional DC/DC converter 306 may be configured to increase the electrical power draw on the DC power bus ring as electrical current and/or voltage.

A bidirectional DC/DC converter 306 may be configured to sense a current DC bus electrical power on the DC power bus 308 and determine whether the current DC bus electrical power achieves, such as by meeting and/or exceeding, the DC bus threshold. In some embodiments, the bidirectional DC/DC converter 306 may sense a current DC bus electrical power on the DC power bus ring and determine whether the current DC bus electrical power achieves the DC bus threshold. In some embodiments, the bidirectional DC/DC converter 306 may be configured to sense the current DC bus electrical power on the DC power bus 308 as electrical current and/or voltage. In some embodiments, the bidirectional DC/DC converter 306 may be configured to sense the current DC bus electrical power on the DC power bus ring as electrical current and/or voltage. An increased electrical power draw on the DC power bus 308 or DC power bus ring, due to a power module cluster 300 generating an electrical power output less than the power module cluster output threshold, and not the same as other power module clusters 300 of the fuel cell microgrid system, may affect the current DC bus electrical power, such as by lowering the current DC bus electrical power to below the DC bus threshold. In response to determining that the current DC bus electrical power does not achieve the DC bus threshold, the bidirectional DC/DC converter 306 may increase a draw of electrical power on the power module cluster 300 to which the bidirectional DC/DC converter 306 is connected in parallel with the uninterruptable power module 304 by the respective DC power bus 309. In some embodiments, the bidirectional DC/DC converter 306 may increase a draw of electrical power on the power module cluster 300 by an amount by which the current DC bus electrical power falls short of the DC bus threshold. In some embodiments, multiple bidirectional DC/DC converters 306 sensing the current DC bus electrical power on the DC power bus ring and determining that the current DC bus electrical power does not achieve the DC bus threshold may increase a draw of electrical power on multiple power module clusters 300. In some embodiments, the multiple bidirectional DC/DC converters 306 may increase a draw of electrical power on multiple power module clusters 300 by equal amounts. In some embodiments, multiple bidirectional DC/DC converters 306 may increase a draw of electrical power on multiple power module clusters 300 by varying amounts. In some embodiments, any number and combination of bidirectional DC/DC converters 306 may be configured to increase the electrical power draw on any number and combination of power module clusters 300 as electrical current and/or voltage. The power module cluster 300, electrically connected to a bidirectional DC/DC converter 306 that increases a draw of electrical power on the power module cluster 300, may increase electrical power generation and output. In some embodiments the power module cluster 300 may increase electrical power generation and output by an amount of increased draw of electrical power by the electrically connected bidirectional DC/DC converter 306. The bidirectional DC/DC converter 306 may provide additional electrical power to the DC power bus 308 to make up for at least part of the increased electrical power draw on the DC power bus 308. In some embodiments, multiple bidirectional DC/DC converters 306 may provide additional electrical power to the DC power bus ring to make up for at least part of the increased electrical power draw on the DC power bus ring. In some embodiments, electrical power on the DC power bus ring from a power module cluster 300 and the bidirectional DC/DC converter 306 electrically connected, by the DC power bus ring, to a bidirectional DC/DC converter 306 drawing electrical power from the DC power bus ring may be transmitted on the DC power bus ring via at least one intermediary bidirectional DC/DC converter 306 electrically connected in series between the other two bidirectional DC/DC converters 306 on the DC power bus ring.

For example, a first bidirectional DC/DC converter 306 may determine that an electrical power output by a first power module cluster 300 does not achieve the power module cluster output threshold. In response to determining that the electrical power output does not achieve the power module cluster output threshold, the first bidirectional DC/DC converter 306 may increase an electrical power draw on the DC power bus 308. The increased electrical power draw on the DC power bus 308 by the first bidirectional DC/DC converter 306 may affect the current DC bus electrical power. At least a second bidirectional DC/DC converter 306 may determine that the current DC bus electrical power does not achieve the DC bus threshold. In response to determining that the current DC bus electrical power does not achieve the DC bus threshold, at least the second bidirectional DC/DC converter 306 may increase an electrical power draw on at least a second power module cluster 300. At least the second bidirectional DC/DC converter 306 may provide additional electrical power to the DC power bus 308 to make up for at least part of the electrical power draw on the DC power bus 308 by the first bidirectional DC/DC converter 306.

For further example, a first bidirectional DC/DC converter 306 may determine that an electrical power output by a first power module cluster 300 does not achieve the power module cluster output threshold. In response to determining that the electrical power output does not achieve the power module cluster output threshold, the first bidirectional DC/DC converter 306 may increase an electrical power draw on the DC power bus ring. The increased electrical power draw on the DC power bus ring by the first bidirectional DC/DC converter 306 may affect the current DC bus electrical power. At least a second bidirectional DC/DC converter 306 may determine that the current DC bus electrical power does not achieve the DC bus threshold. In response to determining that the current DC bus electrical power does not achieve the DC bus threshold, at least the second bidirectional DC/DC converter 306 may increase an electrical power draw on at least a second power module cluster 300. At least the second bidirectional DC/DC converter 306 may provide additional electrical power to the DC power bus 308 to make up for at least part of the electrical power draw on the DC power bus ring by the first bidirectional DC/DC converter 306. At least a third bidirectional DC/DC converter 306 may transmit the electrical power provided by at least the second bidirectional DC/DC converter 306 on the DC power bus ring to the first bidirectional DC/DC converter 306.

In the example of a fuel cell microgrid systems illustrated in FIGS. 3 and 4, the controller 314 may perform and implement the functions of: configuring the power module clusters 300 to generate and output a power module cluster electrical power output, configuring the bidirectional DC/DC converter 306 to output at least part of a DC bus electrical power, comparing of the power module cluster electrical power output to the power module cluster output threshold, determining whether the power module cluster electrical power output achieves the power module cluster output threshold, increasing an electrical power draw on the DC power bus 308 and/or DC power bus ring, determining whether the current DC bus electrical power achieves the DC bus threshold, increasing a draw of electrical power on the power module cluster 300, and transmitting electrical power on the DC power bus ring. The controller 314 may receive signals from and send signals to the power module clusters 300 and the bidirectional DC/DC converters 306 to implement the forgoing functions and/or cause the power module clusters 300 and the bidirectional DC/DC converters 306 to implement the forgoing functions.

As illustrated in FIGS. 3 and 4, a fuel cell microgrid system may include any number and combination of a power module clusters 300, power modules 12, uninterruptable power modules 304, bidirectional DC/DC converters 306, DC busses 308, and controllers 314. In various embodiments, a fuel cell microgrid system may include any number of input/out modules. For example, some embodiments of the fuel cell microgrid system illustrated in FIG. 4 may include 2 or 3 of each of power module clusters 300, uninterruptable power modules 304, and bidirectional DC/DC converters 306. FIGS. 3 and 4 illustrate various embodiments that are meant to be illustrative examples and not limiting of the scope of the claims.

Figure 5:
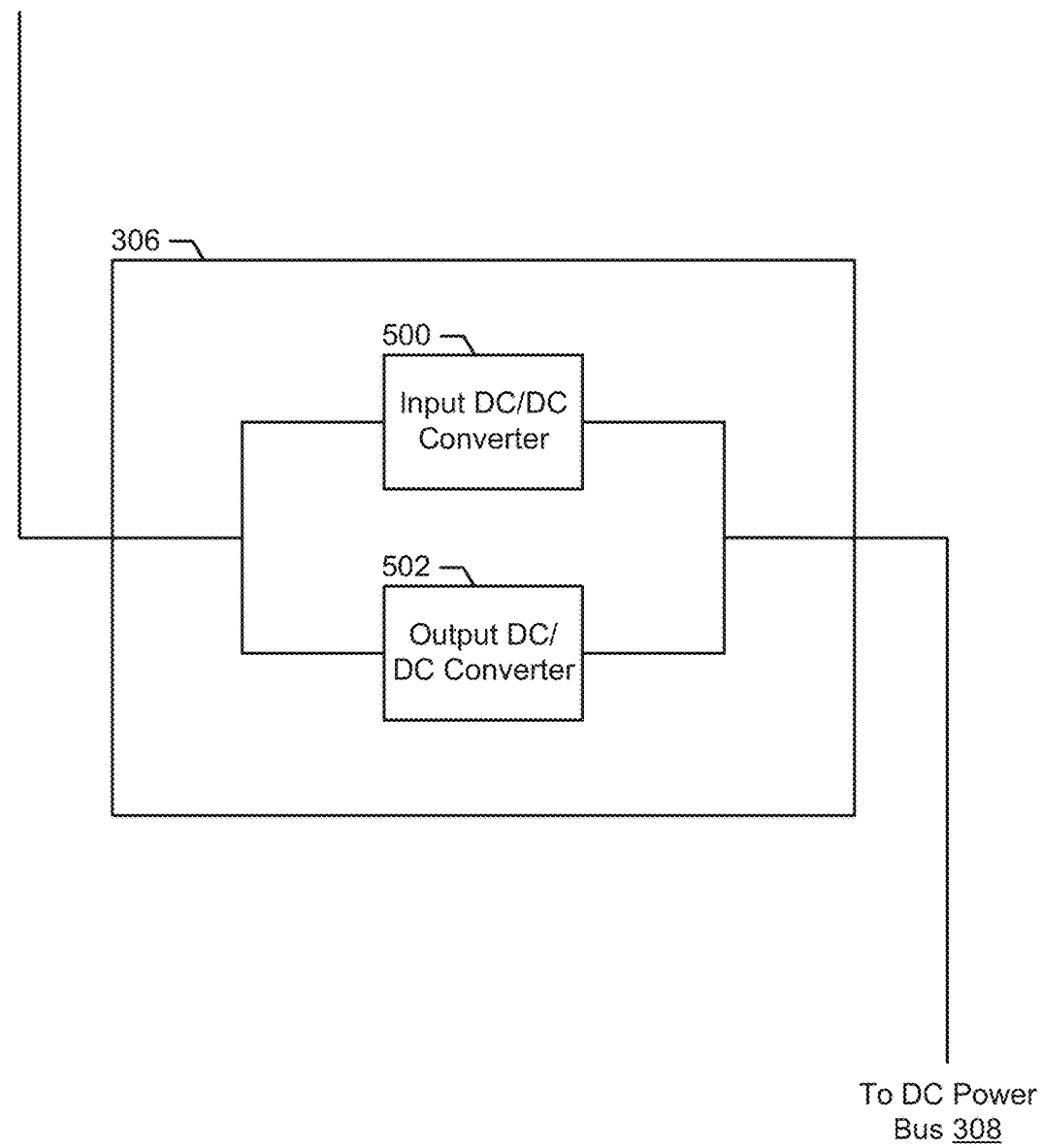
FIG. 5 is a block diagram of a bidirectional direct current (DC)/DC converter according to some embodiments.

FIG. 5 illustrates an example of a bidirectional DC/DC converter 306. As discussed herein, a bidirectional DC/DC converter 306 may include multiple unidirectional DC/DC converters 500, 502. The multiple unidirectional DC/DC converters 500, 502 may be connected in parallel to a first end of the bidirectional DC/DC converter 306 and connected in parallel to a second end of the bidirectional DC/DC converter 306. An input end of an output unidirectional DC/DC converter 502 and an output end of an input unidirectional DC/DC converter 500 may be electrically connected to the first end of the bidirectional DC/DC converter 306, and to a power module cluster 300 and an uninterruptable power module 304 in parallel via a respective DC power bus 309 electrically connected to the first end of the bidirectional DC/DC converter 306. An input end of the input unidirectional DC/DC converter 500 and an output end of the output unidirectional DC/DC converter 502 may be electrically connected to the second end of the bidirectional DC/DC converter 306, and to the DC power bus 308 or DC power bus ring via the second end of the bidirectional DC/DC converter 306.

Figure 6:
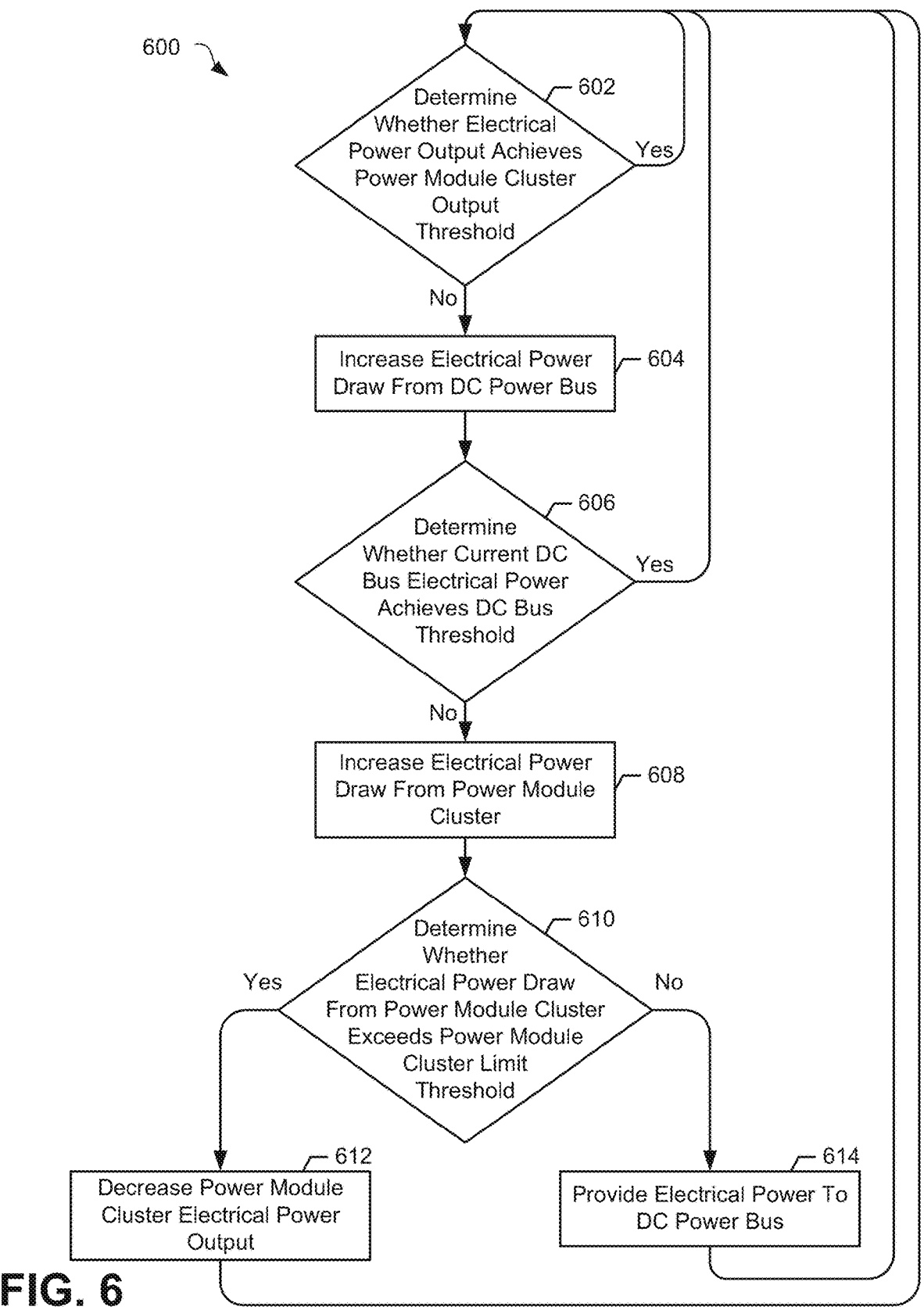
FIG. 6 is a process flow diagram for managing a fuel cell microgrid system according to some embodiments.

FIG. 6 illustrates a method 600 for managing a fuel cell microgrid system according to various embodiments. The method 600 may be implemented using one or more controllers 314 configured to receive signals from and/or send control signals to any number or combination of power modules 12, power module clusters 300, input/output modules 302, uninterruptable power modules 304, bidirectional DC/DC converters 306, DC power busses 308, 309 and/or DC power bus rings, and/or AC loads 312. In order to encompass the alternative configurations enabled in various embodiments, the hardware implementing the method 600 is referred to herein as a "control device."

In determination block 602, the control device may determine whether the electrical power output of a power module cluster achieves a power module cluster output threshold. In some embodiments, the power module cluster output threshold may be configured as a value representative of electrical voltage or electrical current and voltage. The control device may measure the electrical power output of a first power module cluster on the DC power bus electrically connecting the first power module cluster to a first uninterruptable power module and a first bidirectional DC/DC converter in parallel. In some embodiments, the control device may receive signals indicating the electrical power output from the first bidirectional DC/DC converter electrically connected to the first power module cluster. In some embodiments, the control device may directly measure the electrical power output. In some embodiments, the measurements and/or signals received by the control device may be configured to represent electrical current and/or voltage. The control device may interpret signals and/or measurements to determine the electrical power output and compare the electrical power output to the power module cluster output threshold.

In response to determining that the electrical power output achieves the power module cluster output threshold (i.e., determination block 602="Yes"), the control device may repeat determining whether the electrical power output of a power module cluster achieves the power module cluster output threshold in determination block 602.

In response to determining that the electrical power output does not achieve the power module cluster output threshold (i.e., determination block 602="No"), the control device may increase an electrical power draw from a DC power bus in block 604. In some embodiments, the control device may increase the electrical power draw from the DC power bus as electrical current and/or voltage. In some embodiments, the control device may signal to the first bidirectional DC/DC converter to increase an electrical power draw from the DC power bus electrically connecting the first bidirectional DC/DC converter to other bidirectional DC/DC converters in parallel. In some embodiments, the control device may signal to the first bidirectional DC/DC converter to increase an electrical power draw from the DC power bus electrically connecting the first bidirectional DC/DC converter to other bidirectional DC/DC converters in series. In some embodiments, the control device may signal to the first bidirectional DC/DC converter to increase an electrical power draw from the DC power bus ring electrically connecting the first bidirectional DC/DC converter to other bidirectional DC/DC converters in series. In some embodiments, the control device may signal to the first bidirectional DC/DC converter to increase the electrical power draw as electrical current and/or voltage. The control device may signal to the first bidirectional DC/DC converter to increase an electrical power draw from any level, including no power draw, to any higher level. For example, the control device may signal to the first bidirectional DC/DC converter to increase an electrical power draw from a first level to a level sufficient to replace the amount of electrical power by which the electrical power output does not achieve the power module cluster output threshold.

In determination block 606, the control device may determine whether a current DC bus electrical power achieves a DC bus threshold. In some embodiments, the DC bus threshold may be configured as a value representative of electrical voltage or electrical current and voltage. The control device may measure the current DC bus electrical power on the DC power bus, which may include the DC power bus ring, electrically connecting the bidirectional DC/DC converters in parallel or in series. In some embodiments, the control device may receive signals indicating the current DC bus electrical power from any number and combination of bidirectional DC/DC converters electrically connected in parallel to the DC power bus. In some embodiments, the control device may receive signals indicating the current DC bus electrical power from a second bidirectional DC/DC converter electrically connected in series to the first bidirectional DC/DC converter via the DC power bus. In some embodiments, the control device may receive signals indicating the current DC bus electrical power from any number and combination of bidirectional DC/DC converters electrically connected in series by the DC power bus ring. In some embodiments, the control device may directly measure the current DC bus electrical power. In some embodiments, the measurements and/or signals received by the control device may be configured to represent electrical current and/or voltage. The control device may interpret signals and/or measurements to determine the current DC bus electrical power and compare the current DC bus electrical power to the DC bus threshold.

In response to determining that the current DC bus electrical power achieves the DC bus threshold (i.e., determination block 606="Yes"), the control device may repeat determining whether the electrical power output of a power module cluster achieves the power module cluster output threshold in determination block 602.

In response to determining that the current DC bus electrical power does not achieve the DC bus threshold (i.e., determination block 606="No"), the control device may increase an electrical power draw from a power module cluster in block 608. In some embodiments, the control device may increase the electrical power draw from the power module cluster as electrical current and/or voltage. In some embodiments, the control device may signal to at least a second bidirectional DC/DC converter to increase an electrical power draw from at least a second power module cluster electrically connected to at least the second bidirectional DC/DC converter via a respective DC power bus. In some embodiments, the control device may signal to at least the second bidirectional DC/DC converter to increase the electrical power draw as electrical current and/or voltage. In some embodiments, at least the second power module cluster may respond to the increased power draw by increasing generation and output of an electrical power. In some embodiments, the control device may signal to at least the second power module cluster to increase generation and output of an electrical power. In some embodiments, the control device may signal to at least the second power module cluster to increase generation and output of the electrical power as electrical current and/or voltage. The control device may signal to at least the second bidirectional DC/DC converter to increase an electrical power draw from any level, including no power draw, to any higher level. For example, the control device may signal to the second bidirectional DC/DC converter to increase an electrical power draw from a first level to a level sufficient to replace at least part of the amount of electrical power by which the current DC bus electrical power does not achieve the DC bus threshold. The control device may signal to at least the second power module cluster to increase electrical power generation and output from any level, including no power generation and output, to any higher level. For example, the control device may signal to the second power module cluster to increase an electrical power generation and output from a first level to a level sufficient to replace at least part of the amount of electrical power by which the current DC bus electrical power does not achieve the DC bus threshold. In some embodiments, the control device may signal multiple bidirectional DC/DC converters to increase the draw of electrical power on multiple power module clusters by equal amounts. In some embodiments, the control device may signal multiple bidirectional DC/DC converters to increase the draw of electrical power on multiple power module clusters by varying amounts. In some embodiments, the control device may signal to the multiple bidirectional DC/DC converters to increase the draw of electrical power as electrical current and/or voltage.

In determination block 610, the control device may determine whether an electrical power draw from a power module cluster exceeds a power module cluster limit threshold. In some embodiments, the power module cluster limit threshold may be configured as a value representative of electrical voltage or electrical current and voltage. The power module cluster limit threshold may be an electrical power output rating or capacity of a power module cluster. The control device may measure the electrical power output of the second power module cluster on the respective DC power bus electrically connecting the second power module cluster to a second uninterruptable power module and to the second bidirectional DC/DC converter in parallel. In some embodiments, the control device may receive signals indicating the electrical power output from the second bidirectional DC/DC converter electrically connected by the respective DC power bus to the second power module cluster. In some embodiments, the control device may directly measure the electrical power output. In some embodiments, the measurements and/or signals received by the control device may be configured to represent electrical current and/or voltage. The control device may interpret signals and/or measurements to determine the electrical power output and compare the electrical power output to the power module cluster output threshold.

In response to determining that the electrical power draw from the power module cluster exceeds the power module cluster limit threshold (i.e., determination block 610="Yes"), the control device may decrease the electrical power output of the power module cluster in block 612. In some embodiments, the control device may decrease the electrical power output of the power module cluster as electrical current and/or voltage. The control device may signal to the power module cluster to decrease generation and output of electrical power. In some embodiments, the control device may signal to the power module cluster to decrease generation and output of electrical power as electrical current and/or voltage. In some embodiments, the control device may signal to the bidirectional DC/DC converter electrically connected by a respective DC power bus to the power module cluster to decrease an electrical power draw from the power module cluster. In some embodiments, the control device may signal to the bidirectional DC/DC converter to decrease the electrical power draw as electrical current and/or voltage. For example, the control device may signal to the power module cluster to decrease the electrical power output by at least an amount by which the electrical power draw from the power module cluster exceeds the power module cluster limit threshold. For further example, the control device may signal to the bidirectional DC/DC converter to decrease the electrical power draw on the power module cluster by at least an amount by which the electrical power draw from the power module cluster exceeds the power module cluster limit threshold. Following, decreasing the electrical power output of the power module cluster in block 612, the control device may repeat determining whether the electrical power output of a power module cluster achieves the power module cluster output threshold in determination block 602.

In response to determining that the electrical power draw from the power module cluster does not exceed the power module cluster limit threshold (i.e., determination block 610="No"), the control device may provide electrical power to the DC power bus in block 614. In some embodiments, the control device may provide electrical power to the DC power bus as electrical current and/or voltage. The control device may signal to the bidirectional DC/DC converter to output electrical power to the DC power bus electrically connecting the bidirectional DC/DC converter in parallel or in series. In some embodiments, the control device may signal to the bidirectional DC/DC converter to output electrical power to the DC power bus as electrical current and/or voltage. In some embodiments, the bidirectional DC/DC converter may output the electrical power to the DC power bus electrically connecting the bidirectional DC/DC converter in parallel to other bidirectional DC/DC converters. In some embodiments, the bidirectional DC/DC converter may output the electrical power to the DC power bus electrically connecting the bidirectional DC/DC converter in series to other bidirectional DC/DC converters. In some embodiments, the bidirectional DC/DC converter may output the electrical power to the DC power bus ring electrically connecting the bidirectional DC/DC converter in series to other bidirectional DC/DC converters. The control device may signal to the bidirectional DC/DC converter to output an amount of electrical power sufficient to replace at least part of the amount of electrical power by which the current DC bus electrical power does not achieve the DC bus threshold. In some embodiments, the amount of electrical power output by the bidirectional DC/DC converter may be the electrical power output of the power module cluster electrically connected to the bidirectional DC/DC converter by a respective DC power bus less the electrical power drawn by the uninterruptable power module electrically connected in parallel to the power module cluster and the bidirectional DC/DC converter by the same respective DC power bus. In some embodiments, the amount of electrical power output by multiple bidirectional DC/DC converters may be equal. In some embodiments, the amount of electrical power output by multiple bidirectional DC/DC converters may vary. Following, providing electrical power to the DC power bus in block 614, the control device may repeat determining whether the electrical power output of a power module cluster achieves the power module cluster output threshold in determination block 602.

Figure 7:
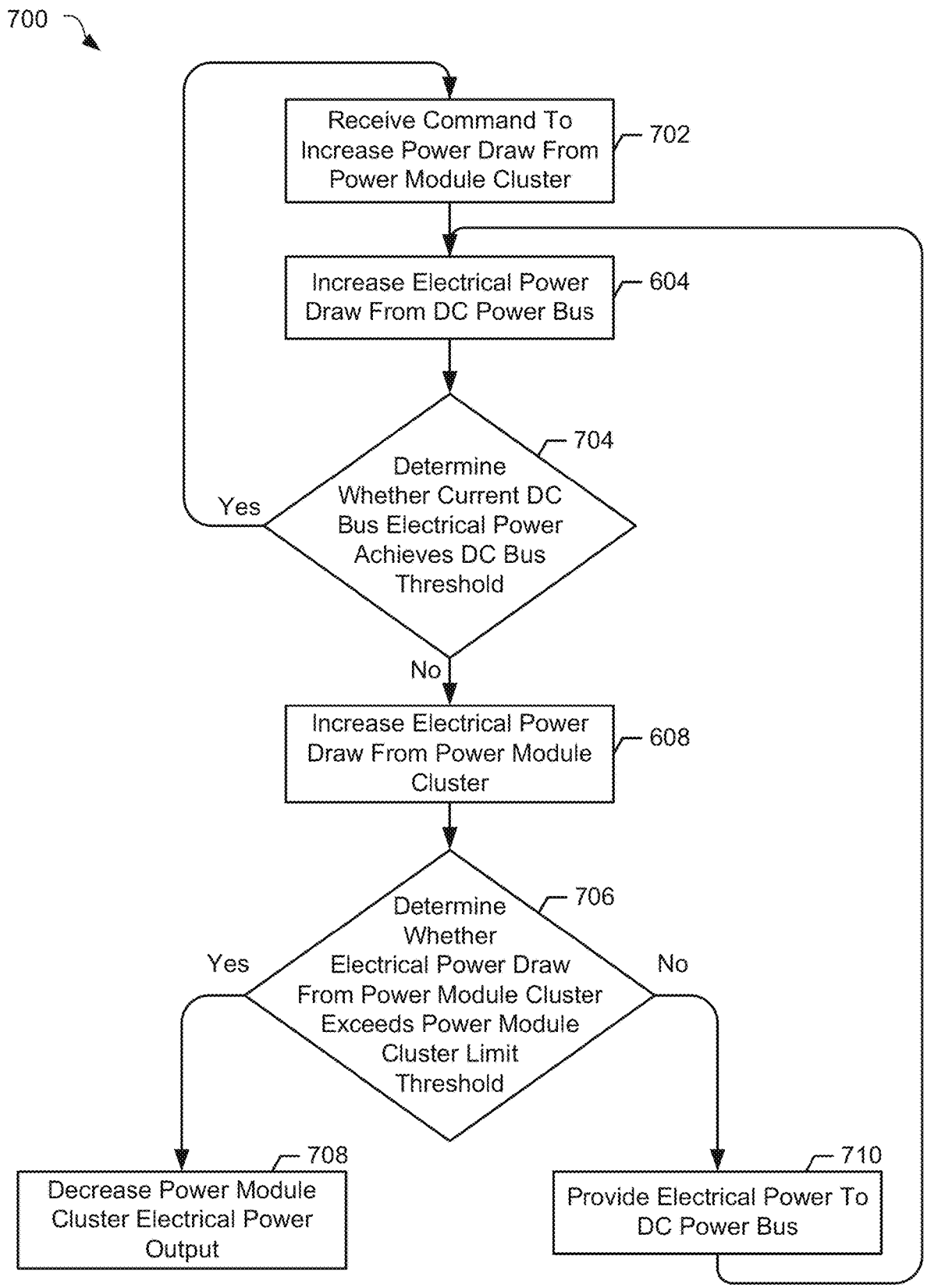
FIG. 7 is a process flow diagram for managing a fuel cell microgrid system according to some embodiments.

FIG. 7 illustrates a method 700 for managing a fuel cell microgrid system according to various embodiments. The method 700 may be implemented using one or more controllers 314 configured to receive signals from and/or send control signals to any number or combination of power modules 12, power module clusters 300, input/output modules 302, uninterruptable power modules 304, bidirectional DC/DC converters 306, DC power busses 308, 309 and/or DC power bus rings, and/or AC loads 312. In order to encompass the alternative configurations enabled in various embodiments, the hardware implementing the method 700 is referred to herein as a "control device."

In block 702, the control device may receive a command to increase a power draw from a power module cluster. In some embodiments, the control device may receive the command in response to a manual user input, such as via a user interface of a control panel or control computing device that may send the command. The user may be promoted to cause issuance of the command to increase a power draw from a power module cluster in response to being informed of an increased power draw on a DC power bus and/or decreased electrical power output by a first power module cluster. The command may be configured to indicate to the control device to increase power draw from at least one power module cluster. In some embodiments, the command may be configured to indicate which of multiple power module clusters on which to increase power draw. In some embodiments, the command may be configured to indicate which of multiple bidirectional DC/DC converters for which to increase power draw on a power module cluster. In some embodiments, the command may be configured to indicate an amount by which to increase power draw on a power module cluster. In some embodiments, the command may be configured to indicate an equal amount by which to increase power draw on multiple power module clusters. In some embodiments, the command may be configured to indicate varying amounts by which to increase power draw on multiple power module clusters. In some embodiments, the command to increase the power draw from the power module cluster may be configured to represent electrical current and/or voltage.

In block 604, the control device may increase an electrical power draw from a DC power bus. In some embodiments, the control device may increase the electrical power draw from the DC power bus as electrical current and/or voltage. In some embodiments, the control device may signal to the first bidirectional DC/DC converter to increase an electrical power draw from the DC power bus electrically connecting the first bidirectional DC/DC converter to other bidirectional DC/DC converters in parallel. In some embodiments, the control device may signal to the first bidirectional DC/DC converter to increase an electrical power draw from the DC power bus electrically connecting the first bidirectional DC/DC converter to other bidirectional DC/DC converters in series. In some embodiments, the control device may signal to the first bidirectional DC/DC converter to increase an electrical power draw from the DC power bus ring electrically connecting the first bidirectional DC/DC converter to other bidirectional DC/DC converters in series. In some embodiments, the control device may signal to the first bidirectional DC/DC converter to increase the electrical power draw as electrical current and/or voltage. The control device may signal to the first bidirectional DC/DC converter to increase an electrical power draw from any level, including no power draw, to any higher level. For example, the control device may signal to the first bidirectional DC/DC converter to increase an electrical power draw from a first level to a level sufficient to replace the amount of electrical power by which the electrical power output of the first power module cluster does not achieve the power module cluster output threshold.

In determination block 704, the control device may determine whether a current DC bus electrical power achieves a DC bus threshold. In some embodiments, the DC bus threshold may be configured as a value representative of electrical voltage or electrical current and voltage. The control device may measure the current DC bus electrical power on the DC power bus, which may include the DC power bus ring, electrically connecting the bidirectional DC/DC converters in parallel or in series. In some embodiments, the control device may receive signals indicating the current DC bus electrical power from any number and combination of bidirectional DC/DC converters electrically connected in parallel to the DC power bus. In some embodiments, the control device may receive signals indicating the current DC bus electrical power from a second bidirectional DC/DC converter electrically connected in series to the first bidirectional DC/DC converter via the DC power bus. In some embodiments, the control device may receive signals indicating the current DC bus electrical power from any number and combination of bidirectional DC/DC converters electrically connected in series by the DC power bus ring. In some embodiments, the control device may directly measure the current DC bus electrical power. In some embodiments, the measurements and/or signals received by the control device may be configured to represent electrical current and/or voltage. The control device may interpret signals and/or measurements to determine the current DC bus electrical power and compare the current DC bus electrical power to the DC bus threshold.

In response to determining that the current DC bus electrical power achieves the DC bus threshold (i.e., determination block 704="Yes"), the control device may return to receiving a command to increase a power draw from a power module cluster in block 702.

In response to determining that the current DC bus electrical power does not achieve the DC bus threshold (i.e., determination block 704="No"), the control device may increase an electrical power draw from a power module cluster in block 608. In some embodiments, the control device may increase the electrical power draw from the power module cluster as electrical current and/or voltage. In some embodiments, the control device may signal to at least a second bidirectional DC/DC converter to increase an electrical power draw from at least a second power module cluster electrically connected to at least the second bidirectional DC/DC converter via a respective DC power bus. In some embodiments, the control device may signal to at least the second bidirectional DC/DC converter to increase the electrical power draw as electrical current and/or voltage. In some embodiments, at least the second power module cluster may respond to the increased power draw by increasing generation and output of an electrical power. In some embodiments, the control device may signal to at least the second power module cluster to increase generation and output of an electrical power. In some embodiments, the control device may signal to at least the second power module cluster to increase generation and output of the electrical power as electrical current and/or voltage. The control device may signal to at least the second bidirectional DC/DC converter to increase an electrical power draw from any level, including no power draw, to any higher level. For example, the control device may signal to the second bidirectional DC/DC converter to increase an electrical power draw from a first level to a level sufficient to replace at least part of the amount of electrical power by which the current DC bus electrical power does not achieve the DC bus threshold. The control device may signal to at least the second power module cluster to increase electrical power generation and output from any level, including no power generation and output, to any higher level. For example, the control device may signal to the second power module cluster to increase an electrical power generation and output from a first level to a level sufficient to replace at least part of the amount of electrical power by which the current DC bus electrical power does not achieve the DC bus threshold. In some embodiments, the control device may signal multiple bidirectional DC/DC converters to increase the draw of electrical power on multiple power module clusters by equal amounts. In some embodiments, the control device may signal multiple bidirectional DC/DC converters to increase the draw of electrical power on multiple power module clusters by varying amounts. In some embodiments, the control device may signal to the multiple bidirectional DC/DC converters to increase the draw of electrical power as electrical current and/or voltage.

In determination block 706, the control device may determine whether an electrical power draw from a power module cluster exceeds a power module cluster limit threshold. In some embodiments, the power module cluster limit threshold may be configured as a value representative of electrical voltage or electrical current and voltage. The power module cluster limit threshold may be an electrical power output rating or capacity of a power module cluster. The control device may measure the electrical power output of the second power module cluster on the respective DC power bus electrically connecting the second power module cluster to a second uninterruptable power module and to the second bidirectional DC/DC converter in parallel. In some embodiments, the control device may receive signals indicating the power module cluster electrical power output from the second bidirectional DC/DC converter electrically connected by the respective DC power bus to the second power module cluster. In some embodiments, the control device may directly measure the electrical power output. In some embodiments, the measurements and/or signals received by the control device may be configured to represent electrical current and/or voltage. The control device may interpret signals and/or measurements to determine the electrical power output and compare the electrical power output to the power module cluster output threshold.

In response to determining that the electrical power draw from the power module cluster exceeds the power module cluster limit threshold (i.e., determination block 706="Yes"), the control device may decrease the electrical power output of the power module cluster in block 706. In some embodiments, the control device may decrease the electrical power output of the power module cluster as electrical current and/or voltage. The control device may signal to the power module cluster to decrease generation and output of electrical power. In some embodiments, the control device may signal to the power module cluster to decrease generation and output of electrical power as electrical current and/or voltage. In some embodiments, the control device may signal to the bidirectional DC/DC converter electrically connected by a respective DC power bus to the power module cluster to decrease an electrical power draw from the power module cluster. In some embodiments, the control device may signal to the bidirectional DC/DC converter to decrease the electrical power draw as electrical current and/or voltage. For example, the control device may signal to the power module cluster to decrease the electrical power output by at least an amount by which the electrical power draw from the power module cluster exceeds the power module cluster limit threshold. For further example, the control device may signal to the bidirectional DC/DC converter to decrease the electrical power draw on the power module cluster by at least an amount by which the electrical power draw from the power module cluster exceeds the power module cluster limit threshold.

In response to determining that the electrical power draw from the power module cluster does not exceed the power module cluster limit threshold (i.e., determination block 706="No"), the control device may provide electrical power to the DC power bus in block 710. In some embodiments, the control device may provide electrical power to the DC power bus as electrical current and/or voltage. The control device may signal to the bidirectional DC/DC converter to output electrical power to the DC power bus electrically connecting the bidirectional DC/DC converter in parallel or in series. In some embodiments, the control device may signal to the bidirectional DC/DC converter to output electrical power to the DC power bus as electrical current and/or voltage. In some embodiments, the bidirectional DC/DC converter may output the electrical power to the DC power bus electrically connecting the bidirectional DC/DC converter in parallel to other bidirectional DC/DC converters. In some embodiments, the bidirectional DC/DC converter may output the electrical power to the DC power bus electrically connecting the bidirectional DC/DC converter in series to other bidirectional DC/DC converters. In some embodiments, the bidirectional DC/DC converter may output the electrical power to the DC power bus ring electrically connecting the bidirectional DC/DC converter in series to other bidirectional DC/DC converters. The control device may signal to the bidirectional DC/DC converter to output an amount of electrical power sufficient to replace at least part of the amount of electrical power by which the current DC bus electrical power does not achieve the DC bus threshold. In some embodiments, the amount of electrical power output by the bidirectional DC/DC converter may be the electrical power output of the power module cluster electrically connected by a respective DC power bus to the bidirectional DC/DC converter less the electrical power drawn by the uninterruptable power module electrically connected in parallel to the power module cluster and the bidirectional DC/DC converter by the same respective DC power bus. In some embodiments, the amount of electrical power output by multiple bidirectional DC/DC converters may be equal. In some embodiments, the amount of electrical power output by multiple bidirectional DC/DC converters may vary. Following, providing electrical power to the DC power bus in block 710, the control device may continue increase an electrical power draw from a DC power bus in block 604.

Figure 8:
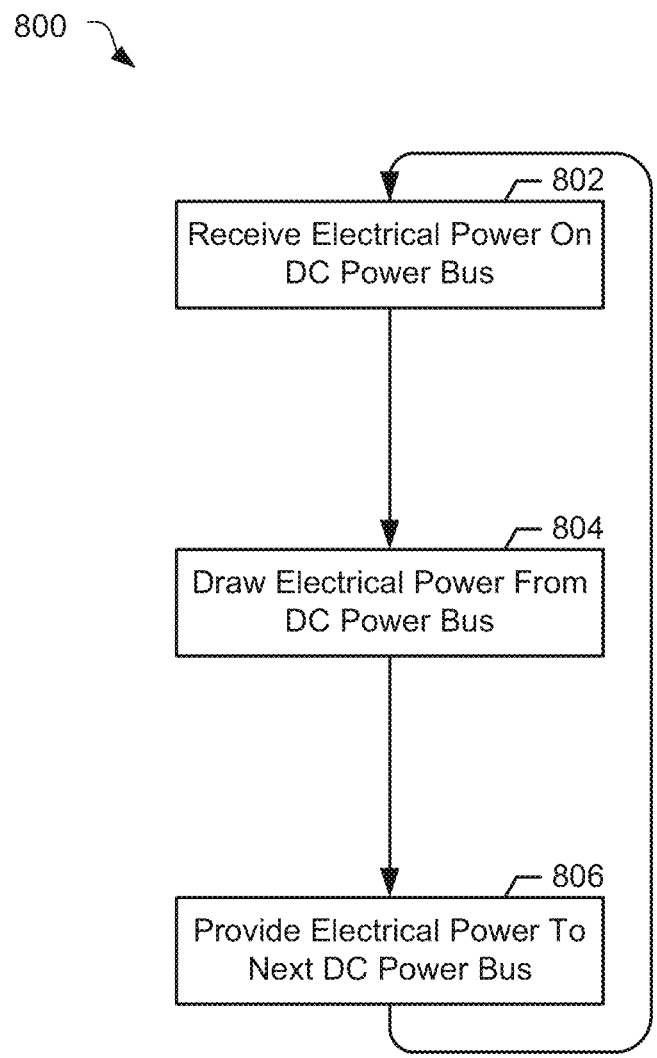
FIG. 8 is a process flow diagram for providing power to a DC power bus ring according to some embodiments.

FIG. 8 illustrates a method 800 for providing power to a DC power bus ring according to various embodiments. The method 800 may be implemented using one or more controllers 314 configured to receive signals from and/or send control signals to any number or combination of power modules 12, power module clusters 300, input/output modules 302, uninterruptable power modules 304, bidirectional DC/DC converters 306, DC power busses 308, 309 and/or DC power bus rings, and/or AC loads 312. In order to encompass the alternative configurations enabled in various embodiments, the hardware implementing the method 800 is referred to herein as a "control device." The method 800 may further describe blocks 614 and 710 described herein for the methods 600 and 700 with reference to FIGS. 6 and 7.

In block 802, a DC power bus may receive electrical power from a bidirectional DC/DC converter. In some embodiments, a control device may instruct and/or cause the bidirectional DC/DC converter to provide electrical power to the DC power bus. The electrical power may be the electrical power provided to the DC power bus in block 614 or 710 described herein for the methods 600 and 700 with reference to FIGS. 6 and 7. In later iterations of block 802, the electrical power may be the electrical power provided to the DC power bus in block 806 as described herein. For the purpose of example, the DC power bus may be referred to as a first DC power bus of a DC power bus ring and the bidirectional DC/DC converter may be referred to as a first bidirectional DC/DC converter.

In block 804, control device may draw electrical power from the DC power bus. In some embodiments, the control device may instruct and/or cause a bidirectional DC/DC converter to draw electrical power from the DC power bus. In some embodiments, the control device may instruct and/or cause the bidirectional DC/DC converter to draw electrical power as electrical current and/or voltage. For example, a second bidirectional DC/DC converter may draw electrical power from the first DC power bus.

In block 806, the control device may provide electrical power to a next DC power bus. In some embodiments, the control device may provide electrical power to the next DC power bus as electrical current and/or voltage. In some embodiments, the control device may instruct and/or cause a bidirectional DC/DC converter to provide electrical power to the next DC power bus. In some embodiments, the control device may instruct and/or cause the bidirectional DC/DC converter to provide electrical power to the next DC power bus as electrical current and/or voltage. For example, the second bidirectional DC/DC converter may provide electrical power from the first DC power bus to a second DC power bus. In some embodiments, the bidirectional DC/DC converter may also provide additional electrical power to the DC power bus drawn from a power module cluster electrically connected by a respective DC power bus.

The method 800 may be cyclical, and the electrical power may be received in block 802, drawn in block 804, and provided in block 806 for successive bidirectional DC/DC converters and DC power busses that make up the DC power bus ring.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements, including the control device 301 as well as connected controllers described herein, may be implemented using computing devices (such as computer) that include programmable processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a control device that may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use any of the described embodiments. Various modifications to these embodiments will be readily apparent to those skilled in the art, and the generic principles defined herein may be applied to other embodiments without departing from the scope of the disclosure. Thus, the claims are not intended to be limited to the embodiments shown herein but are to be accorded the widest scope consistent with the claim language and the principles and novel features disclosed herein.

What is claimed is:

1. A microgrid system, comprising:
a plurality of power module clusters;
a plurality of uninterruptable power modules;
a plurality of bidirectional direct current (DC)/DC converters; and
a DC power bus, wherein:
    each one of the power module clusters of the plurality of power module clusters is electrically connected in parallel to an uninterruptable power module of the plurality of uninterruptable power modules and a first end of a bidirectional DC/DC converter of the plurality bidirectional DC/DC converters, and
    a second end of each one of the bidirectional DC/DC converters of the plurality of bidirectional DC/DC converters is electrically connected in parallel to the DC power bus.

2. The system of claim 1, wherein the plurality of power module clusters comprises a first power module cluster comprising a plurality of fuel cell power modules, and wherein the first power module cluster is electrically connected in parallel to a first bidirectional DC/DC converter of the plurality bidirectional DC/DC converters and a first uninterruptable power module of the plurality of uninterruptable power modules.

3. The system of claim 2, further comprising a controller configured with controller executable instructions configured to cause the controller to implement operations comprising:
    determining whether an electrical power output of the first power module cluster achieves a power module cluster output threshold; and
    increasing an electrical power draw from the DC power bus by the first bidirectional DC/DC converter in response to determining that the electrical power output of the first power module cluster does not achieve the power module cluster output threshold.

4. The system of claim 2, further comprising a controller configured with controller executable instructions configured to cause the controller to implement operations comprising:
    receiving a user initiated command to increase a power draw from the first power module cluster; and
    increasing an electrical power draw from the DC power bus by the first bidirectional DC/DC converter in response to the command to increase a power draw from a first power module cluster.

5. The system of claim 2, further comprising a controller configured with controller executable instructions configured to cause the controller to implement operations comprising:
    determining whether a current DC bus electrical power on the DC power bus achieves a DC bus threshold; and
    increasing an electrical power draw from the first power module cluster by the first bidirectional DC/DC converter in response to determining that the current DC bus electrical power on the DC power bus does not achieve the DC bus threshold;
    determining whether an electrical power draw from the first power module cluster exceeds a power module cluster limit threshold; and
    decreasing the electrical power output of the first power module cluster in response to determining that the electrical power draw from the first power module cluster exceeds the power module cluster limit threshold.

6. A microgrid system, comprising:
a plurality of power module clusters;
a plurality of uninterruptable power modules;
a plurality of bidirectional direct current (DC)/DC converters; and
a plurality of DC power busses, wherein:
    each one of the power module clusters of the plurality of power module clusters is electrically connected in parallel to an uninterruptable power module of the plurality of uninterruptable power modules and a first end of a bidirectional DC/DC converter of the plurality bidirectional DC/DC converters, and
    each one of the bidirectional DC/DC converters of the plurality of bidirectional DC/DC converters is electrically connected at the first end to a DC power bus of the plurality of DC power busses and at a second end to another DC power bus of the plurality of DC power busses.

7. The system of claim 6, wherein:
the plurality of power module clusters comprises a first power module cluster comprising a plurality of fuel cell power modules, and wherein the first power module cluster is electrically connected in parallel to a first bidirectional DC/DC converter of the plurality bidirectional DC/DC converters and a first uninterruptable power module of the plurality of uninterruptable power modules; and
the plurality of DC power busses comprises a first DC power bus electrically connected to a second end of the first bidirectional DC/DC converter and a first end of a second bidirectional DC/DC converter of the plurality bidirectional DC/DC converters.

8. The system of claim 7, further comprising a controller configured with controller executable instructions configured to cause the controller to implement operations comprising:

determining whether an electrical power output of the first power module cluster achieves a power module cluster output threshold; and increasing an electrical power draw from the first DC power bus by the first bidirectional DC/DC converter in response to determining that the electrical power output of the first power module cluster does not achieve the power module cluster output threshold.

9. The system of claim 7, further comprising a controller configured with controller executable instructions configured to cause the controller to implement operations comprising:

receiving a user initiated command to increase a power draw from the first power module cluster; and increasing an electrical power draw from the first DC power bus by the first bidirectional DC/DC converter in response to the command to increase a power draw from a first power module cluster.

10. The system of claim 7, further comprising a controller configured with controller executable instructions configured to cause the controller to implement operations comprising:

determining whether a current DC bus electrical power on the first DC power bus achieves a DC bus threshold; and increasing an electrical power draw from the first power module cluster by the first bidirectional DC/DC converter in response to determining that the current DC bus electrical power on the first DC power bus does not achieve the DC bus threshold.

11. The system of claim 7, further comprising:

a second DC power bus of the plurality of DC power busses electrically connected to a second end of the second bidirectional DC/DC converter and a first end of a third bidirectional DC/DC converter of the plurality bidirectional DC/DC converters; and a controller configured with controller executable instructions configured to cause the controller to implement operations comprising:

providing electrical power to the second DC power bus by the third bidirectional DC/DC converter;

drawing electrical power from the second DC power bus by the second bidirectional DC/DC converter;

providing electrical power to the first DC power bus by the second bidirectional DC/DC converter; and drawing electrical power from the first DC power bus by the first bidirectional DC/DC converter.

12. A method of managing a microgrid system, comprising:

providing electrical power to a direct current (DC) power bus by a plurality of bidirectional DC/DC converters, wherein each bidirectional DC/DC converter of the plurality of bidirectional DC/DC converters is electrically connected to at least one power module cluster of a plurality of power module clusters, and wherein each bidirectional DC/DC converter provides the electrical power from the at least one power module cluster; and drawing electrical power from the DC power bus by a first bidirectional DC/DC converter.

13. The method of claim 12, further comprising:

determining whether an electrical power output of a first power module cluster achieves a power module cluster output threshold, wherein the first power module cluster is electrically connected to the first bidirectional DC/DC converter; and increasing an electrical power draw from the DC power bus by the first bidirectional DC/DC converter in response to determining that the electrical power output of the first power module cluster does not achieve the power module cluster output threshold.

14. The method of claim 12, further comprising:

receiving a user initiated command to increase a power draw from a first power module cluster, wherein the first power module cluster is electrically connected to the first bidirectional DC/DC converter; and increasing an electrical power draw from the DC power bus by the first bidirectional DC/DC converter in response to the command to increase a power draw from a first power module cluster.

15. The method of claim 12, further comprising:

determining whether a current DC bus electrical power on the DC power bus achieves a DC bus threshold; and increasing an electrical power draw from the plurality of power module clusters by the plurality of bidirectional DC/DC converters in response to determining that the current DC bus electrical power on the DC power bus does not achieve the DC bus threshold.

16. The method of claim 12, further comprising:

determining whether an electrical power draw from a first power module cluster of the plurality of power module clusters exceeds a power module cluster limit threshold; and decreasing the electrical power output of the first power module cluster in response to determining that the electrical power draw from the first power module cluster exceeds the power module cluster limit threshold.

17. The method of claim 12, wherein:

providing electrical power to a direct current (DC) power bus by a plurality of bidirectional DC/DC converters comprises providing electrical power to the direct current DC power bus by the plurality of bidirectional DC/DC converters in parallel; and each of the plurality of power module clusters a plurality of fuel cell power modules.

18. The method of claim 12, wherein:

the first bidirectional DC/DC converter includes a first end and a second end;

the plurality of bidirectional DC/DC converters comprises a second bidirectional DC/DC converter having a first end and a second end and a third bidirectional DC/DC converter having a first end and a second end;

the DC power bus comprises a first DC power bus electrically connected to the second end of the first bidirectional DC/DC converter and the first end of the second bidirectional DC/DC converter and a second DC power bus electrically connected to the second end of the second bidirectional DC/DC converter and the first end of the third bidirectional DC/DC converter; and providing electrical power to a direct current (DC) power bus by a plurality of bidirectional DC/DC converters comprises providing electrical power to the second DC power bus by the third bidirectional DC/DC converter.

19. The method of claim 18, wherein providing electrical power to a direct current (DC) power bus by a plurality of bidirectional DC/DC converters further comprises:

drawing electrical power from the second DC power bus by the second bidirectional DC/DC converter; and providing electrical power to the first DC power bus by the second bidirectional DC/DC converter.

20. The method of claim 12, wherein:

the first bidirectional DC/DC converter includes a first end and a second end;

the plurality of bidirectional DC/DC converters comprises a second bidirectional DC/DC converter having a first end and a second end and a third bidirectional DC/DC converter having a first end and a second end;

the DC power bus comprises a first DC power bus electrically connected to the second end of the first bidirectional DC/DC converter and the first end of the second bidirectional DC/DC converter and a second DC power bus electrically connected to the second end of the second bidirectional DC/DC converter and the first end of the third bidirectional DC/DC converter; and drawing electrical power from the DC power bus by a first bidirectional DC/DC converter comprises drawing electrical power from the first DC power bus by the first bidirectional DC/DC converter.

* * * * *